US012623392B2

(12) United States Patent
Mavridis et al.

(10) Patent No.: US 12,623,392 B2
(45) Date of Patent: *May 12, 2026

(54) POLYMER RECYCLATE PROCESSES AND PRODUCTS

(71) Applicant: EQUISTAR CHEMICALS, LP, Houston, TX (US)

(72) Inventors: Harilaos Mavridis, Lebanon, OH (US); Mick C. Hundley, Loveland, OH (US); Sameer D. Mehta, Mason, OH (US); Marco Consalvi, Ochhiobello (IT); Gerhardus Meier, Frankfurt (DE); Lindsay E. Corcoran, Liberty Township, OH (US); Andreas Maus, Frankfurt (DE); Timo Hees, Mainz (DE); Pascal Rebmann, Frankfurt (DE); Diana Doetsch, Bad Kreuznach (DE); Katharina Elsas, Mainz (DE)

(73) Assignee: Equistar Chemicals, LP, Houston, TX (US)

( * ) Notice: Subject to any disclaimer, the term of this patent is extended or adjusted under 35 U.S.C. 154(b) by 861 days.

This patent is subject to a terminal disclaimer.

(21) Appl. No.: 17/845,805

(22) Filed: Jun. 21, 2022

(65) Prior Publication Data

US 2023/0023978 A1      Jan. 26, 2023

Related U.S. Application Data

(60) Provisional application No. 63/238,655, filed on Aug. 30, 2021, provisional application No. 63/213,429, filed on Jun. 22, 2021.

(51) Int. Cl.
| | |
|---|---|
| B29C 48/00 | (2019.01) |
| B29C 48/08 | (2019.01) |
| B29C 48/80 | (2019.01) |
| B29K 23/00 | (2006.01) |
| C08F 8/50 | (2006.01) |
| C08J 5/18 | (2006.01) |
| C08J 11/10 | (2006.01) |
| C08J 11/12 | (2006.01) |
| C08L 23/06 | (2006.01) |
| C08L 23/0807 | (2025.01) |
| C08L 23/12 | (2006.01) |
| C08L 23/16 | (2006.01) |
| B29K 105/26 | (2006.01) |

(52) U.S. Cl.
CPC ........... B29C 48/022 (2019.02); B29C 48/08 (2019.02); B29C 48/802 (2019.02); C08F 8/50 (2013.01); C08J 5/18 (2013.01); C08J 11/10 (2013.01); C08J 11/12 (2013.01); C08L 23/06 (2013.01); C08L 23/0815 (2013.01); C08L 23/12 (2013.01); C08L 23/16 (2013.01); B29C 2948/92704 (2019.02); B29K 2023/0625 (2013.01); B29K 2023/0633 (2013.01); B29K 2023/0641 (2013.01); B29K 2023/065 (2013.01); B29K 2023/0658 (2013.01); B29K 2023/12 (2013.01); B29K 2105/26 (2013.01); C08J 2323/06 (2013.01); C08J 2323/12 (2013.01); C08L 2205/025 (2013.01); C08L 2207/062 (2013.01); C08L 2207/066 (2013.01); C08L 2207/20 (2013.01)

(58) Field of Classification Search
CPC .... C08J 11/10; C08J 11/12; C08J 2323/04–08
See application file for complete search history.

(56) References Cited

U.S. PATENT DOCUMENTS

| | | | |
|---|---|---|---|
| 4,375,531 A | 3/1983 | Ross | |
| 4,493,923 A | 1/1985 | McCullough, Jr. | |
| 5,639,818 A | 6/1997 | Lee et al. | |
| 6,433,133 B1 * | 8/2002 | Coe ...................... C08F 255/02 | |
| | | | 525/938 |
| 7,317,054 B2 | 1/2008 | Starita | |
| 8,633,256 B2 | 1/2014 | Riise | |
| 11,976,183 B1 * | 5/2024 | Hees ...................... C08L 23/06 | |
| 2003/0113496 A1 | 6/2003 | Harris | |
| 2010/0298502 A1 | 11/2010 | Moad et al. | |

(Continued)

FOREIGN PATENT DOCUMENTS

| | | | | |
|---|---|---|---|---|
| CN | 105111568 A | * | 12/2015 | ............. B29C 48/92 |
| EP | 0533154 A1 | | 3/1993 | |

(Continued)

OTHER PUBLICATIONS

Machine Translation of CN105111568A. Dec. 2, 2015. (Year: 2015).*

(Continued)

*Primary Examiner* — Stephen E Rieth

(57) ABSTRACT

Methods for processing LDPE recyclates including, but not limited to, polyethylene and polypropylene and compositions therefrom are provided. LDPE recyclate can be visbroken to improve processing characteristics and/or devolatilized to remove waste byproducts to produce processed LDPE recyclates. Processed LDPE recyclates are compounded with pre-consumer polyolefins to produce blend compositions having acceptable or even improved processing characteristics. Such pre-consumer polyolefins can also be visbroken to further tailor processing characteristics of such polymer blends. A combination of extruders and/or extruder zones can be used at the same or different locations for visbreaking and/or compounding of both LDPE recyclate and/or pre-consumer polyolefins.

14 Claims, 2 Drawing Sheets

(56) References Cited

U.S. PATENT DOCUMENTS

| | | | |
|---|---|---|---|
| 2013/0046034 A1 | 2/2013 | Riise et al. | |
| 2014/0046102 A1* | 2/2014 | D'Amato | C08K 5/09 |
| | | | 585/17 |
| 2018/0186971 A1 | 7/2018 | Herring et al. | |
| 2019/0136100 A1* | 5/2019 | Tran | C09J 123/0815 |
| 2019/0177448 A1 | 6/2019 | Ruemer et al. | |
| 2019/0233614 A1 | 8/2019 | Peterson et al. | |
| 2020/0354555 A1 | 11/2020 | Bram | |
| 2022/0153883 A1* | 5/2022 | Camilo | C08K 5/14 |

FOREIGN PATENT DOCUMENTS

| | | |
|---|---|---|
| EP | 1085039 A2 | 3/2001 |
| EP | 3235833 A1 | 10/2017 |
| EP | 3377574 B1 | 8/2019 |
| EP | 3800221 A1 | 4/2021 |
| MX | 2015017931 A | 6/2017 |
| WO | 0136495 A1 | 5/2001 |
| WO | 2016038110 A2 | 3/2016 |
| WO | 2020070176 A1 | 4/2020 |
| WO | 2020182435 A1 | 9/2020 |
| WO | 2021089193 A1 | 5/2021 |
| WO | 2021122299 A1 | 6/2021 |
| WO | 2022133008 A1 | 6/2022 |

OTHER PUBLICATIONS

Derwent: "Derwent World Patents Index Polymer Indexing Dictionary", May 28, 2019 (May 28, 2019), XP055592698, Retrieved from the Internet: URL:https://clarivate.com/wp-content/uploads/2018/05/Polymer_Indexing_Dictionary_05_2018.pdf.

Anonymous: "Search Engineering Material by Property Value", XP055965250, Retrieved from the Internet: URL: https://www.matweb.com/search/PropertySearch.aspx [retrieved on Sep. 27, 2022].

Lazar A et al: "Thermal and Thermorheologic Characterization of Different Polyolefin Waste Fractions", Materials Science Forum, vol. 907, Sep. 25, 2017 (Sep. 25, 2017), pp. 74-79, XP002807630, Trans Tech Publications Switzerland DOI: 10.4028/www.scientific.net/MSF.907.74.

Anonymous: "Typical Molecular Weights of Common Polymers—Jordi Labs—Analytical Chemistry Testing Laboratory", Aug. 6, 2018 (AUg. 6, 2018), XP055965443, Retrieved from the Internet: URL:https://jordilabs.com/blog/typical-polymer-molecular-weights/ [retrieved on Sep. 27, 2022].

Ouano Augustus C. et al: "The molecular weight distribution of polypropylene: Molecular Weight Distribution of Polypropylene", Journal of Polymer Science. Part C—Polymer Symposia, vol. 21, No. 1, Jan. 1, 1968 (Jan. 1, 1968), pp. 309-315, XP055965243, United States ISSN: 0449-2994, DOI:10.1002/polc.5070210127.

Bersted B H: "Prediction of Dynamic and Transient Rheological Properties of Polystyrene and High-Density Polyethylene Melts from the Molecular Weight Distribution", Journal of Applied Polymer Science, vol. 23, 10. 5, Mar. 9, 1979 (Mar. 9, 1979), pp. 1279-1289, XP002807631, DOI: 10.1002/app.1979.070230502.

Thakur Ashish et al: Melt Flow Rate Study of Recycled High Density Polyethylene International Journal of Emerging Technology and Advanced Engineering, ISO Certified Journal, Nov. 1, 2008 (Nov. 1, 2008), XP055961470, Retrieved from the Internet: URL:https://www.researchgate.net/profile/Ashish-Thakur-4/.

The Partial International Search Report for PCT/US2022/034345 mailed Oct. 24, 2022.

Cecon Victor S et al: "The Effect of Post-Consumer Recycled Polyethylene (PCRPE) on the Properties of Polyethylene Blends of Different Densities", Polymer Degradation and Stability, vol. 190, May 19, 2021 (May 19, 2021), p. 109627, XP55968635, GB ISSN: 0141-3910, DOI:10.1016/j.polymdegradstab.2021.109627.

The Partial International Search Report for PCT/US2022/034352 mailed Nov. 14, 2022.

The Partial International Search Report for PCT/US2022/034365 mailed Oct. 11, 2022.

Phao Xue Yan et al: "Rheological Properties of RLDPE/LLDPE Blends", Materials, Mechanicalengineering and Manufacture: Selected, Peer Reviewed Papers From the Second International Conference on Applied Mechanics, Materials and Manufacturing (ICAMMM 2012), Nov. 17-18, 2012, Changsha, China, [Online] vol. 268-270, No. Part 1, Dec. 1, 2012 (Dec. 1, 2012), pp. 115-118, XP055970791, CH DOI: 10.4028/www.scientific.net/AMM.268-270.115 ISBN: 978-3-03785-579-9 Retrieved from the Internet: URL:http://dx.doi.org/10.4028/www.scientific.net/AMM268-270.115> [retrieved on Oct. 28, 2022].

The Partial International Search Report for PCT/US2022/034371 mailed Nov. 14, 2022.

The International Search Report and The Written Opinion for PCT/US2022/034377 mailed Oct. 11, 2022.

* cited by examiner

POLYMER RECYCLATE PROCESSES AND PRODUCTS

CROSS-REFERENCE TO RELATED APPLICATIONS

This application is filed under the Patent Cooperation Treaty, which claims the priority of U.S. Provisional Patent Application Ser. No. 63/213,429, entitled "POLYMER RECYCLATE PROCESSES AND PRODUCTS," filed on Jun. 22, 2021, and U.S. Provisional Patent Application Ser. No. 63/238,655, entitled "POLYMER RECYCLATE PROCESSES AND PRODUCTS," filed on Aug. 30, 2021, the contents of which are incorporated by reference herein in their entirety.

FIELD OF THE INVENTION

The present disclosure relates to the use of extrusion processes to improve the processing characteristics of polyolefin recyclates, either alone or in combination with other polyolefins. The invention further relates to compositions produced by such processes.

BACKGROUND OF THE INVENTION

Polyolefins, including polyethylene and polypropylene, may be used in many applications, including packaging for food and other goods, electronics, automotive components, and a variety of manufactured articles. Waste plastic materials may be obtained from a variety of sources, including differential recovery of municipal plastic wastes that are constituted of flexible packaging (cast film, blown film and BOPP film), rigid packaging, blow molded bottles and injection molded containers. Often, through a step of separation from other polymers, such as PVC, PET or PS, two main polyolefinic fractions may be obtained; namely, polyethylenes (including, HDPE, LDPE, LLDPE) and polypropylenes (including homopolymers, random copolymers, heterophasic copolymers).

The multicomponent nature of the recycled polyolefins or the polyolefinic fractions may result in low mechanical and optical performances of prepared articles or of polyolefin formulations in which part of a virgin LDPE is replaced by recycled polymer. Unpredictable mechanical and/or optical properties can result from variability of one or more characteristics of the recycled polyolefin including, but not limited to, melt index, high load melt index, melt elasticity, complex viscosity, or combinations thereof. In addition, the recycled polyolefins or the polyolefinic fractions may contain impurities or contamination by other components. Moreover, the molecular weight, the molecular weight distribution and/or the comonomer content of the recycled polyolefins or of the polyolefinic fractions can limit the range of virgin LDPEs into which recycled polyolefins can be incorporated. Another limitation for the use of recycled polyolefins may be the presence of unpleasant odors coming from volatile organic compounds which may have been absorbed in these polymers during their usage.

This disclosure provides—in the case of polyethylenes—it may be desirable to separate polyethylene waste into portions which are predominately HDPE, predominately MDPE, predominately LDPE, predominately LLDPE. This disclosure provides—in the case of the LDPE portion—processes to produce polyolefin compositions comprising recycled LDPE, such polyolefin compositions having a useful combination of properties. Such processes may be highly flexible and could be implemented with commonly used equipment and familiar techniques to produce a wide variety of products.

SUMMARY OF THE INVENTION

In general, the present disclosure relates to methods for processing polyolefin recyclates, in particular low density polyethylene ("LDPE") recyclates. Such processing includes implementing in an extruder visbreaking conditions to convert a LDPE recyclate into a visbroken LDPE recyclate having a reduced weight average molecular weight. In some embodiments, the LDPE recyclate is also subjected to devolatilization conditions to convert the LDPE recyclate into a visbroken LDPE recyclate having a reduced weight average molecular weight and a reduced volatile organic compounds ("VOC") content.

Visbreaking conditions include thermal visbreaking and/or peroxidation visbreaking. Thermal visbreaking includes temperature, pressure, and mechanical shear sufficient to cause polymer chain scission to predominate over polymer chain branching or crosslinking. Peroxidation visbreaking may occur when a peroxide as added to the polymer melt in an extruder followed by thermal decomposition of the peroxide to form free radicals, which react with the polymer chain to result in chain scission. In some embodiments, visbreaking conditions consist of thermal visbreaking at a temperature at least 180° C. above the melting point of the LDPE in the absence of or substantially in the absence of oxygen.

Devolatilization conditions can include reduction of VOC in a polyolefin by a portion of an extruder having an intensive mixing arrangement and devolatilization sections to enable removal of VOC at high temperatures. Devolatilization conditions can be further enhanced by injection of a gas into the extruder, distribution of the gas in the polymer melt to scavenge VOC components, and extraction of the gas and scavenged VOC components by venting and/or vacuum.

In some embodiments, the processed LDPE recyclate can be pelletized as a product at the extruder discharge. In other embodiments, the processed LDPE recyclate can be fed to a second extruder to be compounded or blended with a virgin LDPE. In yet other embodiments, the virgin LDPE can be the polyolefin powder product from a polymerization apparatus, a pelletized polyolefin, or the polyolefin melt, which is the product of a third extruder. In any of the embodiments in this paragraph, the virgin LDPE can have been subjected to a visbreaking process prior to addition to the second reactor.

In some embodiments, virgin LDPE is fed to a third extruder and the polymer melt form the third extruder is co-fed to the second extruder along with processed LDPE recyclate melt.

In some embodiments, a composition is provided where the composition is or comprises a polymer blend of from 5 wt. % to 90 wt. % of a LDPE recyclate and from 10 wt. % to 95 wt. % of a virgin LDPE, wherein all weight percentages are based on the combined weight of the polymer blend and one or both of the LDPE recyclate feedstock and the virgin LDPE are visbroken. Visbreaking can be thermal visbreaking and/or peroxidation visbreaking.

The foregoing has outlined rather broadly the features and technical advantages of the present invention in order that the detailed description of the invention that follows may be better understood. Additional features and advantages of the invention will be described hereinafter, which form the subject matter of the claims of the invention. It should be appreciated by those skilled in the art that the conception and specific embodiments disclosed may be readily utilized as a basis for modifying or designing other film structures and/or processes for carrying out the same purposes of the present invention. It should also be realized by those skilled in the art that such equivalent constructions do not depart from the spirit and scope of the invention as set forth in the appended claims. The novel features which are believed to be characteristic of the invention, both as to its structure and method of manufacture, together with further objects and advantages will be better understood from the following description.

BRIEF DESCRIPTION OF THE FIGURES

The claimed subject matter may be understood by reference to the following description taken in conjunction with the accompanying drawings, in which like reference numerals identify like elements, and in which:

Figure 1:
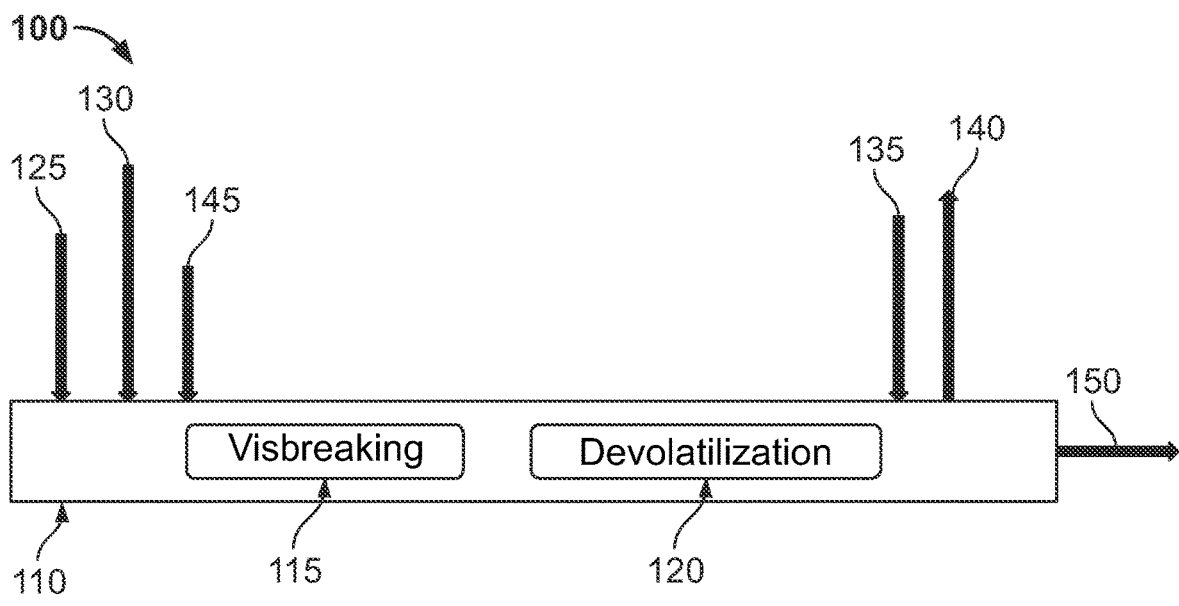
FIG. 1 is a simplified flow diagram of the process to obtain a processed LDPE recyclate according to embodiments of the invention.

While the disclosed process and composition are susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the subject matter claimed below will now be disclosed. In the interest of clarity, some features of some actual implementations may not be described in this specification. It will be appreciated that in the development of any such actual embodiments, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase. It must also be noted that, as used in the specification and the appended claims, the singular forms "a," "an," and "the" include plural references unless otherwise specified.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

"Antioxidant agents," as used herein, means compounds that inhibit oxidation, a chemical reaction that can produce free radicals and chain reactions.

"Compounding conditions," as used herein, means temperature, pressure, and shear force conditions implemented in an extruder to provide intimate mixing of two or more polymers and optionally additives to produce a substantially homogeneous polymer product.

"Devolatilization conditions," as used herein, means subjecting a polymer melt in an extruder to injection and withdrawal of a scavenging gas, addition of heat, physical mixing, pressure reduction by venting or applying vacuum, or a combination thereof. Devolatilization conditions implemented in an extruder are sufficient to reduce the VOC of a polymer fed to the extruder by a predetermined percentage and/or to a predetermined VOC target for polymer exiting the extruder. Devolatilization conditions are directed to reduction of VOC in a polyolefin by a portion of an extruder having an intensive mixing arrangement and devolatilization sections to enable removal of VOC at high temperatures. Devolatilization conditions can be further enhanced by injection of a gas into the extruder, distribution of the gas in the polymer melt to scavenge VOC components, and extraction of the gas and scavenged VOC components by venting or vacuum.

"Devolatilized LDPE recyclate," as used herein, means the product obtained by subjecting an LDPE recyclate feedstock to devolatilization conditions as described herein.

"Extruder," as used herein within the context of the "first extruder," second extruder," and "third extruder," in some embodiments, means separate extrusion apparatuses, and in other embodiments, means separate sections within a single extrusion apparatus. In some embodiments, the first extruder and the second extruder are separate machines. In some embodiments, the first extruder and the second extruder are separate sections in a single machine. In some embodiments, the second extruder and the third extruder are separate machines. In some embodiments, the second extruder and the third extruder are separate sections in a single machine. In some embodiments, the first extruder, the second extruder, and the third extruder are separate machines. In some embodiments, the first extruder, the second extruder, and the third extruder are separate sections in a single machine. "Extruder," as used herein includes any device or combinations of devices capable of continuously processing one or more polyolefins under visbreaking conditions, compounding conditions, melting conditions, or devolatilization conditions, including, but not limited to, Farrel continuous mixers (FCM™ mixers, available from Farrel Corporation, Ansonia, Connecticut).

"HDPE," as used herein, means ethylene homopolymers and ethylene copolymers produced in a suspension, solution, slurry, or gas phase polymerization process and having a density in the range of 0.940 g/cm³ to 0.970 g/cm³.

"LDPE recyclate feedstock," as used herein, means LDPE recyclate after collection and sorting but prior to being subjected to the processes disclosed herein.

"LDPE recyclate," as used herein, means post-consumer recycled ("PCR") LDPE and/or post-industrial recycled ("PIR") LDPE. Poly olefin recyclate is derived from an end product that has completed its life cycle as a consumer item and would otherwise be disposed of as waste (e.g., a polyethylene water bottle) or from plastic scrap that is generated as waste from an industrial process. Post-consumer polyolefins include polyolefins that have been collected in commercial and residential recycling programs, including flexible packaging (cast film, blown film and BOPP film), rigid packaging, blow molded bottles, and injection molded containers. Usually, through a step of separation from other polymers, such as PVC, PET or PS, two main polyolefinic fractions are obtained, namely polyethylene recyclate (including HDPE, MDPE, LDPE, and LLDPE) and polypropylene recyclate (including homopolymers, random copolymers, and heterophasic copolymers). Polyethylene recyclate can be further separated to recover a portion having LDPE as the primary constituent. In addition to contamination from dissimilar polymers, LDPE recyclate frequently contains other impurities such as PMMA, PC, wood, paper, textile, cellulose, food, and other organic wastes, many of which cause the LDPE recyclate to have an unpleasant odor before and after typical processing.

"LDPE," as used herein, means ethylene homopolymers and ethylene copolymers produced in a high pressure free radical polymerization and having a density in the range of 0.910 g/cm³ to 0.940 g/cm³.

"LLDPE," as used herein, means ethylene copolymers produced in a suspension, solution, slurry, or gas phase polymerization process and having a density in the range of 0.910 g/cm³ to 0.940 g/cm³.

"MDPE," as used herein, means ethylene copolymers produced in a suspension, solution, slurry, or gas phase polymerization process and having a density in the range of 0.925 g/cm³ to 0.940 g/cm³.

"Melting conditions," as used herein, means temperature, pressure, and shear force conditions, either alone or in combination with one another, that are required to produce a polymer melt from a feed of polymer pellets or powder.

"Processed LDPE recyclate," as used herein, means the product obtained by subjecting an LDPE recyclate feedstock to visbreaking conditions or to visbreaking conditions followed by devolatilization conditions, as described herein.

"Virgin LDPEs," as used herein, are pre-consumer polyolefins. Pre-consumer polyolefins are polyolefin products obtained directly or indirectly from petrochemical feedstocks fed to a polymerization apparatus. Pre-consumer polyolefins can be subjected to post polymerization processes such as, but not limited to, extrusion, pelletization, visbreaking, and/or other processing completed before the product reaches the end-use consumer. In some embodiments, virgin LDPEs have a single heat history. In some embodiments, virgin LDPEs have more than one heat history. In some embodiments, virgin LDPEs comprise no additives. In some embodiments, virgin LDPEs comprise additives.

"Visbreaking conditions," as used herein, means thermal visbreaking and/or peroxidation visbreaking. Thermal visbreaking includes temperature, pressure, and/or mechanical shear sufficient to cause polymer chain scission to predominate of polymer chain branching or crosslinking. Peroxidation visbreaking occurs when a peroxide as added to the polymer melt in an extruder followed by thermal decomposition of the peroxide to form free radicals, which react with the polymer chain to result in chain scission. As used herein, a polymer that has been visbroken will have lower number average and weight average molecular weight, a narrower molecular weight distribution, higher melt index, and a higher high load melt index. In some embodiments, visbreaking conditions consist of thermal visbreaking at a temperature greater than or equal to 300° C., or in the range of from 320° C. to 400° C., in the absence of or substantially in the absence of oxygen.

"Visbreaking," as used herein, means treating a polymer thermally and/or chemically to produce a reduction in $M_n$, $M_w$, and MWD ($M_w/M_n$), and an increase in melt index $I_2$ (ASTM D-1238, 2.16 kg @ 190° C.) and high load melt index $I_{21}$ (ASTM D-1238, 21.6 kg @ 190° C.) of the LDPE so treated. Applying high temperatures and/or adding radical source such as peroxides to polyolefinic materials results in degradation of the polymer chains and reduction of the average molecular weight of the polymer. In parallel, the molecular weight distribution gets narrower. When intentionally performing such methods for modifying the properties of polymers, these practices are commonly called "visbreaking".

"Visbroken LDPE recyclate," as used herein, means the product obtained by subjecting an LDPE recyclate feedstock to visbreaking conditions as described herein.

Processing LDPE Recyclate Feedstock

In FIG. 1, flow diagram 100 includes a visbreaking extruder 110 having a visbreaking zone 115 and an optional devolatilization zone 120. LDPE recyclate feedstock 125 is added to visbreaking extruder 110 proximate to the inlet end of the extruder. The LDPE recyclate is drawn through the extruder 110 by one or more rotating screw drives in the barrel of the visbreaking extruder 110. The length of the visbreaking extruder 110 is separated into one or more zones. Each zone can have one or more of a specified thread pitch on the screw drive, inlets for injection of gas 130, 135, vents or vacuum connections for withdrawal of gas 140, means for addition or withdrawal of heat, inlets for injection of peroxide 145, and inlets for injection of additives in order to impart preselected process conditions including, but not limited to pressure, temperature, and/or shear force.

FIG. 1 shows an embodiment with both a visbreaking zone 115 and an optional devolatilization zone 120. Other embodiments can have a visbreaking zone 115 alone without a devolatilization zone. Process conditions in the visbreaking extruder 110 can further be controlled by rotation speed of the screw drive. Processed LDPE recyclate 150 is withdrawn proximate to the discharge of the visbreaking extruder 110 for further processing or pelletization.

LDPE Recyclate Feedstock

In some embodiments, LDPE recyclate feedstock is derived from ethylene homopolymers, copolymers of units derived from ethylene and units derived from one or more of $C_3$-$C_{12}$ α-olefins, copolymers of units derived from ethylene and units derived from one or more of alpha mono-olefins comprising polar groups, or mixtures thereof. LDPE recyclate feedstock can be derived as a portion of post-consumer recycled polyolefin and/or post-industrial recycled polyolefin that is predominately comprised of LDPE recyclate, wherein "predominately" means greater than or equal to 80 wt %, greater than or equal to 85 wt %, greater than or equal to 90 wt %, or greater than or equal to 95 wt %, based on the total weight of the LDPE recyclate feedstock.

Such ethylene homopolymers can be produced in a high pressure, free-radical polymerization process, such as in one or more tubular reactors, one or more autoclave reactors, or a combination thereof. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and $C_3$-$C_{12}$ α-olefins can be produced in a high pressure, free-radical polymerization process, such as in one or more tubular reactors, one or more autoclave reactors, or a combination thereof. Such $C_3$-$C_{12}$ α-olefins include, but are not limited to, substituted or unsubstituted $C_3$ to $C_{12}$ alpha olefins such as propylene, butene, pentene, hexene, heptene, octene, nonene, decene, undecene, dodecane, and isomers thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and one or more of alpha mono-olefins comprising polar groups can be produced in a high pressure, free-radical polymerization process, such as in one or more tubular reactors, one or more autoclave reactors, or a combination thereof. Such alpha mono-olefins comprising polar groups include, but are not limited to, methacrylic acids, esters, nitriles, and amides, such as acrylic acid, methacrylic acid, cyclohexyl methacrylate, methyl acrylate, acrylonitrile, acrylamide, or mixtures thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

LDPE recyclate feedstock, derived from LDPE as described above, can be characterized by having:

i) a density in the range of from 0.910 g/cm³ to 0.940 g/cm³ or from 0.915 g/cm³ to 0.935 g/cm³;

ii) a melt index (2.16 kg, 190° C.) less than or equal to 5.0 g/10 min., less than or equal to 1.0 g/10 min., less than or equal to 0.5 g/10 min., less than or equal to 0.2 g/10 min., or less than or equal to 0.1 g/10 min.;

iii) a molecular weight distribution ($M_w/M_n$) greater than 4.0, greater than 8.0, or greater than 15, and/or less than 35, less than 30, or less than 25;

iv) a weight average molecular weight greater than or equal to 85,000 daltons, greater than or equal to 120,000 daltons, greater than or equal to 180,000 daltons, or greater than or equal to 200,000 daltons, and/or less than or equal to 500,000 daltons, less than or equal to 400,000 daltons, less than or equal to 350,000 daltons, or less than or equal to 250,000 daltons; and v) a melt elasticity ("ER") greater than or equal to 1.0, greater than or equal to 1.4, or greater than or equal to 2.0.

In some embodiments, in addition to the foregoing properties, the LDPE recyclate feedstock can be further characterized by having one or more of vi) a first VOC content;

vii) a first high load melt index ($I_{21}$, 21.6 kg, 190° C.;

viii) a first melt index ratio (MIR, $I_{21}/I_2$);

ix) a first long chain branching parameter (g') in the range of from 0.40 to 0.75;

x) a first overall polydispersity ratio (PDR);

xi) a first complex viscosity ratio ($\eta^*_{0.1}/\eta^*_{100}$); and xii) a first intrinsic viscosity.

Visbreaking Extruder

LDPE recyclate feedstock is fed to a first extruder and is subjected to visbreaking conditions and optionally devolatilization conditions.

Visbreaking

Visbreaking conditions are implemented in the visbreaking zone of the first extruder and are tailored for LDPE. In some embodiments, visbreaking conditions means thermal visbreaking and/or peroxidation visbreaking. In some embodiments, visbreaking conditions consist of thermal visbreaking, wherein the temperature in the visbreaking zone is greater than or equal to 300° C., where it is believed that chain scission reactions exceed long-chain branching and/or crosslinking reactions. In some embodiments, temperatures in the visbreaking zone can be in the range of from 320° C. to 500° C., from 340° C. to 480° C., or from 360° C. to 460° C. In some embodiments, instrumentation at the first extruder discharge monitors rheology directly or indirectly ($I_2$, $I_{21}$, viscosity, melt elasticity, complex viscosity ratio, or the like) to measure and assist in control of visbreaking. In some embodiments, where antioxidant addition is used in conjunction with visbreaking, the antioxidant addition point is at a location on the first extruder after a substantial portion of the visbreaking reaction has taken place. In some embodiments, visbreaking conditions consist of thermal visbreaking the absence of or substantially in the absence of oxygen, wherein substantial absence of oxygen means less than or equal to 1.0 wt %, less than or equal to 0.10 wt %, or less than or equal to 0.01 wt %, based on the total weight of polymer in the extruder. In some embodiments, the visbreaking extruder comprises one or more melt filters.

Devolatilization

Devolatilization conditions are optionally implemented in the first extruder and are directed to reduction of VOC in the LDPE recyclate feedstock by a portion of an extruder having an intensive mixing arrangement and devolatilization sections to enable removal of VOC at high temperatures. Devolatilization conditions can be further enhanced by: injection of a scavenging gas, such as, but not limited to, nitrogen, carbon-dioxide, water, or combinations thereof, into the extruder; distribution of the gas in the polymer melt to scavenge VOC components; and extraction of the gas and scavenged VOC components by venting and/or vacuum.

Processed LDPE Recyclate

A processed LDPE recyclate is withdrawn from the discharge of the visbreaking extruder, wherein "processed" means that the LDPE recyclate feedstock was subjected to visbreaking conditions or visbreaking conditions followed by devolatilization conditions. Processed LDPE recyclate, as described above, can be characterized by having:

i) a density, wherein the ratio of the density of the processed LDPE recyclate to the density of the LDPE recyclate feedstock is greater than or equal to 1.0;

ii) a melt index, wherein the ratio of the melt index of the processed LDPE recyclate to the melt index of the LDPE recyclate feedstock is greater than or equal to 5.0; and iii) a molecular weight distribution, wherein the ratio of molecular weight distribution of the processed LDPE recyclate to the molecular weight distribution of the LDPE recyclate feedstock is in the range of from 0.60 to 0.99 or from 0.75 to 0.95;

iv) a weight average molecular weight ("$M_{w2}$"), wherein the ratio of the weight average molecular weight of the processed LDPE recyclate to the weight average molecular weight of the LDPE recyclate feedstock is in the range of from 0.60 to 0.99 or from 0.75 to 0.95; and v) a melt elasticity ("ER"), wherein the ratio of the ER of the processed LDPE recyclate to the ER of the LDPE recyclate feedstock is in the range of from 0.30 to 0.90.

In some embodiments, in addition to the foregoing properties, the processed LDPE recyclate can be further characterized by having one or more of:

vi) a VOC content, wherein the ratio of the VOC content of the processed LDPE recyclate to the VOC content of the LDPE recyclate feedstock is less than or equal to 0.9, 0.8, 0.7, 0.6, or 0.5, each alone or in combination with a lower limit of greater than or equal to 0.1;

vii) a high load melt index ($I_{21}$, 21.6 kg, 190° C.), wherein the ratio of the high load melt index of the processed LDPE recyclate to the high load melt index of the LDPE recyclate feedstock is greater than or equal to 2.0;

viii) a melt index ratio (MIR, $I_{21}/I_2$), wherein the MIR of the processed LDPE recyclate to the MIR of the LDPE recyclate feedstock is in the range of from 0.50 to 0.75;

ix) a long chain branching parameter (g'), wherein the ratio of the g' of the processed LDPE recyclate to the g' of the LDPE recyclate feedstock is greater than or equal to 1.0;

x) an overall polydispersity ratio (PDR), wherein the ratio of the PDR of the processed LDPE recyclate to the PDR of the LDPE recyclate feedstock is less than or equal to 0.5;

xi) a complex viscosity ratio ($\eta^*_{0.1}/\eta^*_{100}$), wherein the ratio of the complex viscosity ratio of the processed LDPE recyclate to the complex viscosity ratio of the LDPE recyclate feedstock is less than or equal to 0.4, and/or the second complex viscosity is less than or equal to 12, and $\eta^*_{0.1}$ is the complex viscosity at 0.1 rad/sec and $\eta^*_{100}$ is the complex viscosity at 100 rad/sec, both at a temperature of 190° C.; and xii) an intrinsic viscosity [η], wherein the ratio of the intrinsic viscosity of the processed LDPE recyclate to the intrinsic viscosity of the LDPE recyclate feedstock is less than or equal to 0.85.

Figure 2:
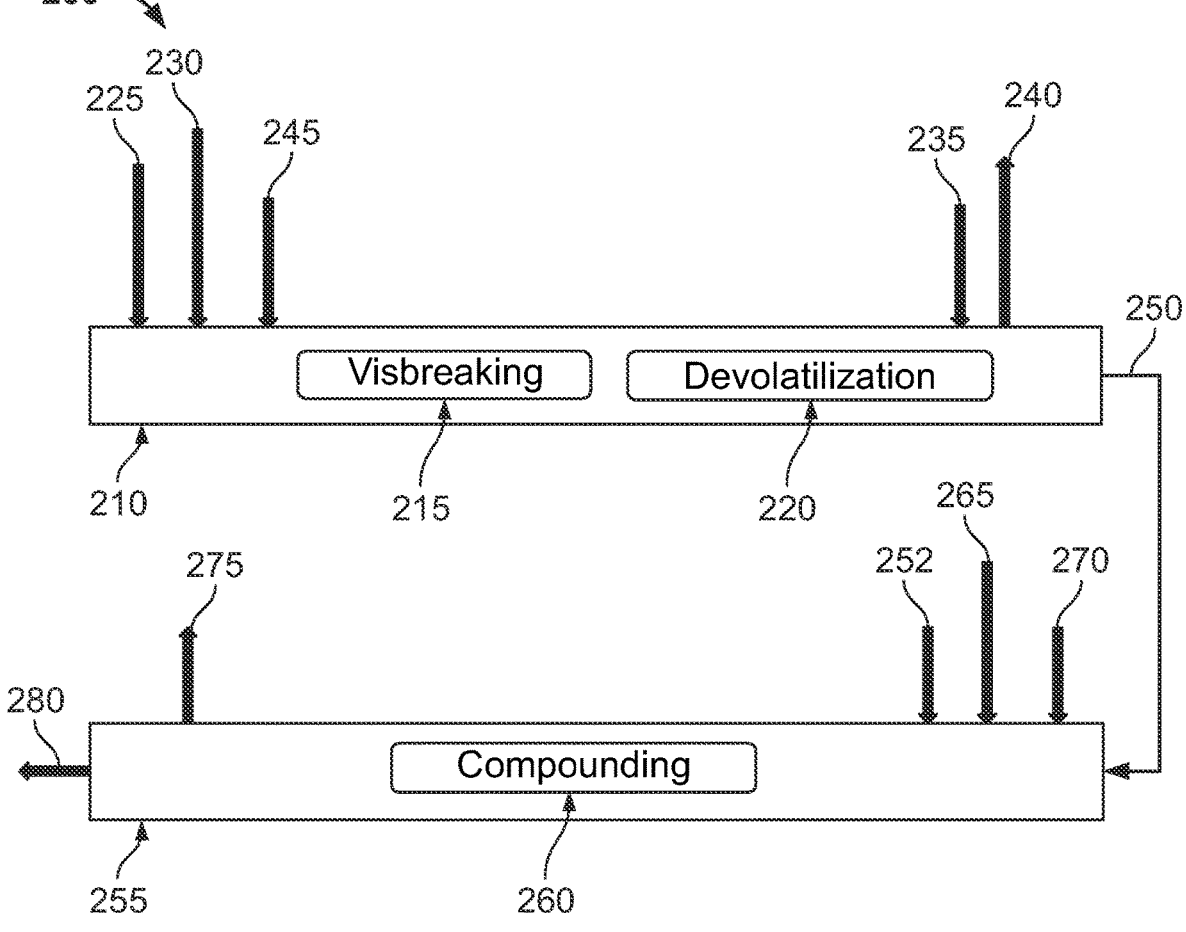
FIG. 2 is simplified flow diagram of the process to obtain a blend of a processed LDPE recyclate and a virgin LDPE using two extruders according to embodiments of the invention.

Blending of Processed LDPE Recyclate and a Polyolefin Blend Component-Two Extruders In FIG. 2, flow diagram 200 includes a visbreaking extruder 210 and a compounding extruder 255. Embodiments of the present invention as shown in FIG. 2 include a visbreaking extruder 210 having a visbreaking zone 215 and a devolatilization zone 220. LDPE recyclate feedstock 225 is added to visbreaking extruder 210 proximate to the inlet end of the extruder. The LDPE recyclate feedstock 225 is drawn through the visbreaking extruder 210 by one or more rotating screw drives in the barrel of the visbreaking extruder 210. The length of the visbreaking extruder 210 is separated into one or more zones. Each zone can have one or more of a specified thread pitch on the screw drive, inlets for injection of gas 230, 235, vents or vacuum connections for withdrawal of gas 240, means for addition or withdrawal of heat, inlets for injection of peroxide 245, and inlets for injection of additives in order to impart preselected process conditions including, but not limited to pressure, temperature, and shear force.

FIG. 2 shows an embodiment with both a visbreaking zone 215 and a devolatilization zone 220. Other embodiments can have either a visbreaking zone 215 or a devolatilization zone 220 independently without the other. Process conditions in the visbreaking extruder 210 can further be controlled by rotation speed of the screw drive. Processed LDPE recyclate 250 is withdrawn proximate to the discharge of the visbreaking extruder 210 for further processing.

Embodiments of FIG. 2 include a second extruder 255, having a compounding zone 260. Processed LDPE recyclate 250 is added to compounding extruder 255 as a first blend component proximate to the inlet end of the extruder along with a polyolefin blend component 252 and subjected to compounding conditions. The polyolefin blend component 252 comprises a virgin polyolefin, a polyolefin recyclate feedstock, a processed polyolefin recyclate, or a combination thereof. In some embodiments, the virgin polyolefin comprises a virgin LDPE, a virgin LLDPE, a virgin HDPE, a virgin MDPE, a virgin polypropylene, or a combination thereof. In some embodiments, the polyolefin recyclate feedstock comprises a LDPE recyclate feedstock, a LLDPE recyclate feedstock, a HDPE recyclate feedstock, a MDPE recyclate feedstock, a polypropylene recyclate feedstock, or a combination thereof. In some embodiments, the processed polyolefin recyclate comprises a second processed LDPE recyclate, a processed LLDPE recyclate, a processed HDPE recyclate, a processed MDPE recyclate, a processed polypropylene recyclate, or a combination thereof. In some embodiments, a polyolefin blend component comprises a virgin LDPE, a LDPE recyclate feedstock, a processed LDPE recyclate, or a combination thereof. The mixture of LDPE recyclate 250 and polyolefin blend component 252 is drawn through the compounding extruder 255 by one or more rotating screw drives in the barrel of the extruder 255. One or more additional inlets proximate to the inlet end of the extruder provide for the addition of antioxidant agent 265 and/or other components 270. The length of the compounding extruder 255 can be separated into one or more zones. Each zone can have one or more of a specified thread pitch on the screw drive, means for addition or withdrawal of heat, inlets for injection of additives, and vents or vacuum connections for withdrawal of gas 275, in order to impart preselected process conditions including, but not limited to pressure, temperature, and shear force. A blend 280 of the processed LDPE recyclate 250 and the polyolefin blend component 252 is withdrawn proximate to the discharge of the compounding extruder 255 for further processing or pelletization.

In some embodiments, the polyolefin blend component can be a polyolefin powder product from a polymerization apparatus, a pelletized polyolefin, or the polyolefin melt, which is the product withdrawn from a third extruder. In some of these embodiments, the polymerization apparatus comprises two, three, or more polymerization reactors and/or two, three, or more polymerization zones within a polymerization reactor. More specific polymerization apparatus embodiments include, but are not limited to, two or three gas phase fluidized-bed reactors in series, two or three slurry phase reactors in series, and a gas phase fluidized-bed reactor in series with a multizone circulation reactor.

In some embodiments, the amount of the polyolefin blend component, which itself can comprise two or more polymers, is determined based on the logarithmic mixing rule, wherein blend components satisfy the following equation:

$$\log(MFR_{blend}) = \sum_{i=1}^{n} (w_i \times \log(MFR_i))$$

wherein:

MFR is $I_2$, $I_{21}$, or other selected melt index;

$MFR_{blend}$ is the target MFR of the final blend product;

n is the number of components in the blend; and i is the i-th component of an n-component blend.

Blend Components

A first blend component is a processed LDPE recyclate produced from a visbreaking extruder. A second blend component comprises a virgin polyolefin, a polyolefin recyclate feedstock, a processed polyolefin recyclate, or a combination thereof. In some embodiments, the virgin polyolefin comprises a virgin LDPE, a virgin LLDPE, a virgin HDPE, a virgin polypropylene, or a combination thereof. In some embodiments, the polyolefin recyclate feedstock comprises a LDPE recyclate feedstock, a LLDPE recyclate feedstock, a HDPE recyclate feedstock, a polypropylene recyclate feedstock, or a combination thereof. In some embodiments, the processed polyolefin recyclate comprises a second processed LDPE recyclate, a processed LLDPE recyclate, a processed HDPE recyclate, a processed polypropylene recyclate, or a combination thereof. In some embodiments, a polyolefin blend component comprises a virgin LDPE, a LDPE recyclate feedstock, a processed LDPE recyclate, or a combination thereof. When the processed LDPE recyclate is blended with another processed LDPE recyclate, the first LDPE recyclate will have at least one parameter that distinguishes it from the second processed LDPE recyclate.

Virgin LDPE

In some embodiments, LDPE recyclate feedstock is selected from ethylene homopolymers, copolymers of units derived from ethylene and units derived from one or more of $C_3$-$C_{12}$ α-olefins, copolymers of units derived from ethylene and units derived from one or more of alpha mono-olefins comprising polar groups, or mixtures thereof.

Such ethylene homopolymers can be produced in a high pressure, free-radical polymerization process, such as in one or more tubular reactors, one or more autoclave reactors, or a combination thereof. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and $C_3$-$C_{12}$ α-olefins can be produced in a high pressure, free-radical polymerization process, such as in one or more tubular reactors, one or more autoclave reactors, or a combination thereof. Such $C_3$-$C_{12}$ α-olefins include, but are not limited to, substituted or unsubstituted $C_3$ to $C_{12}$ alpha olefins such as propylene, butene, pentene, hexene, heptene, octene, nonene, decene, undecene, dodecane, and isomers thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and one or more of alpha mono-olefins comprising polar groups can be produced in a high pressure, free-radical polymerization process, such as in one or more tubular reactors, one or more autoclave reactors, or a combination thereof. Such alpha mono-olefins comprising polar groups include, but are not limited to, methacrylic acids, esters, nitriles, and amides, such as acrylic acid, methacrylic acid, cyclohexyl methacrylate, methyl acrylate, acrylonitrile, acrylamide, or mixtures thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Virgin LDPE can be characterized by having:

i) a density in the range of from 0.910 g/cm³ to 0.940 g/cm³ or from 0.915 g/cm³ to 0.935 g/cm³;

ii) a melt index (2.16 kg, 190° C.) in the range of from 1.0 g/10 min. to 100 g/10 min., from 2.0 g/10 min. to 80 g/10 min., or from 3.0 g/10 min. to 50 g/10 min.;

iii) a molecular weight distribution ($M_w/M_n$) greater than 15; and iv) a weight average molecular weight less than or equal to 250,000 daltons, less than or equal to 200,000 daltons, less than or equal to 150,000 daltons, or less than or equal to 100,000 daltons.

LDPE Recyclate Feedstock

In some embodiments, LDPE recyclate feedstock is derived from ethylene homopolymers, copolymers of units derived from ethylene and units derived from one or more of $C_3$-$C_{12}$ α-olefins, copolymers of units derived from ethylene and units derived from one or more of alpha mono-olefins comprising polar groups, or mixtures thereof. LDPE recyclate feedstock can be derived as a portion of post-consumer recycled polyolefin and/or post-industrial recycled polyolefin that is predominately comprised of LDPE recyclate, wherein "predominately" means greater than or equal to 80 wt %, greater than or equal to 85 wt %, greater than or equal to 90 wt %, or greater than or equal to 95 wt %, based on the total weight of the LDPE recyclate feedstock.

Such ethylene homopolymers can be produced in a high pressure, free-radical polymerization process, such as in one or more tubular reactors, one or more autoclave reactors, or a combination thereof. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and $C_3$-$C_{12}$ α-olefins can be produced in a high pressure, free-radical polymerization process, such as in one or more tubular reactors, one or more autoclave reactors, or a combination thereof. Such $C_3$-$C_{12}$ α-olefins include, but are not limited to, substituted or unsubstituted $C_3$ to $C_{12}$ alpha olefins such as propylene, butene, pentene, hexene, heptene, octene, nonene, decene, undecene, dodecane, and isomers thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm$^3$ to 0.940 g/cm$^3$.

Such copolymers of ethylene and one or more of alpha mono-olefins comprising polar groups can be produced in a high pressure, free-radical polymerization process, such as in one or more tubular reactors, one or more autoclave reactors, or a combination thereof. Such alpha mono-olefins comprising polar groups include, but are not limited to, methacrylic acids, esters, nitriles, and amides, such as acrylic acid, methacrylic acid, cyclohexyl methacrylate, methyl acrylate, acrylonitrile, acrylamide, or mixtures thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm$^3$ to 0.940 g/cm$^3$.

LDPE recyclate feedstock, derived from LDPE as described above, can be characterized by having:

i) a density in the range of from 0.910 g/cm$^3$ to 0.940 g/cm$^3$ or from 0.915 g/cm$^3$ to 0.935 g/cm$^3$;

ii) a melt index (2.16 kg, 190° C.) less than or equal to 5.0 g/10 min., less than or equal to 1.0 g/10 min., less than or equal to 0.5 g/10 min., less than or equal to 0.2 g/10 min., or less than or equal to 0.1 g/10 min.;

iii) a molecular weight distribution ($M_w/M_n$) greater than 4.0, greater than 8.0, or greater than 15, and/or less than 35, less than 30, or less than 25;

iv) a weight average molecular weight greater than or equal to 85,000 daltons, greater than or equal to 120,000 daltons, greater than or equal to 180,000 daltons, or greater than or equal to 200,000 daltons, and/or less than or equal to 500,000 daltons, less than or equal to 400,000 daltons, less than or equal to 350,000 daltons, or less than or equal to 250,000 daltons; and v) a melt elasticity ("ER") greater than or equal to 1.0, greater than or equal to 1.4, or greater than or equal to 2.0.

In some embodiments, in addition to the foregoing properties, the LDPE recyclate feedstock can be further characterized by having one or more of:

vi) a first VOC content;

vii) a first high load melt index ($I_{21}$, 21.6 kg, 190° C.;

viii) a first melt index ratio (MIR, $I_{21}/I_2$);

ix) a first long chain branching parameter (g') in the range of from 0.40 to 0.75;

x) a first overall polydispersity ratio (PDR);

xi) a first complex viscosity ratio ($\eta^*_1/\eta^*_{100}$); and xii) a first intrinsic viscosity.

Processed LDPE Recyclate

A processed LDPE recyclate is withdrawn from the discharge of the visbreaking extruder, wherein "processed" means that the LDPE recyclate feedstock was subjected to visbreaking conditions or visbreaking conditions followed by devolatilization conditions. Processed LDPE recyclate, as described above, can be characterized by having:

i) a density, wherein the ratio of the density of the processed LDPE recyclate to the density of the LDPE recyclate feedstock is greater than or equal to 1.0;

ii) a melt index, wherein the ratio of the melt index of the processed LDPE recyclate to the melt index of the LDPE recyclate feedstock is greater than or equal to 5.0; and iii) a molecular weight distribution, wherein the ratio of molecular weight distribution of the processed LDPE recyclate to the molecular weight distribution of the LDPE recyclate feedstock is in the range of from 0.60 to 0.99 or from 0.75 to 0.95;

iv) a weight average molecular weight ("$M_{w2}$"), wherein the ratio of the weight average molecular weight of the processed LDPE recyclate to the weight average molecular weight of the LDPE recyclate feedstock is in the range of from 0.60 to 0.99 or from 0.75 to 0.95; and v) a melt elasticity ("ER"), wherein the ratio of the ER of the processed LDPE recyclate to the ER of the LDPE recyclate feedstock is in the range of from 0.30 to 0.90.

In some embodiments, in addition to the foregoing properties, the processed LDPE recyclate can be further characterized by having one or more of:

vi) a VOC content, wherein the ratio of the VOC content of the processed LDPE recyclate to the VOC content of the LDPE recyclate feedstock is less than or equal to 0.9, 0.8, 0.7, 0.6, or 0.5, each alone or in combination with a lower limit of greater than or equal to 0.1;

vii) a high load melt index ($I_{21}$, 21.6 kg, 190° C.), wherein the ratio of the high load melt index of the processed LDPE recyclate to the high load melt index of the LDPE recyclate feedstock is greater than or equal to 2.0;

viii) a melt index ratio (MIR, $I_{21}/I_2$), wherein the MIR of the processed LDPE recyclate to the MIR of the LDPE recyclate feedstock is in the range of from 0.50 to 0.75;

ix) a long chain branching parameter (g'), wherein the ratio of the g' of the processed LDPE recyclate to the g' of the LDPE recyclate feedstock is greater than or equal to 1.0;

x) an overall polydispersity ratio (PDR), wherein the ratio of the PDR of the processed LDPE recyclate to the PDR of the LDPE recyclate feedstock is less than or equal to 0.5;

xi) a complex viscosity ratio ($\eta^*_{0.1}/\eta^*_{100}$), wherein the ratio of the complex viscosity ratio of the processed LDPE recyclate to the complex viscosity ratio of the LDPE recyclate feedstock is less than or equal to 0.4, and/or the second complex viscosity is less than or equal to 12, and $\eta^*_{0.1}$ is the complex viscosity at 0.1 rad/sec and $\eta^*_{100}$ is the complex viscosity at 100 rad/sec, both at a temperature of 190° C.; and xii) an intrinsic viscosity [η], wherein the ratio of the intrinsic viscosity of the processed LDPE recyclate to the intrinsic viscosity of the LDPE recyclate feedstock is less than or equal to 0.85.

Compounding Extruder

Processed LDPE recyclate and a polyolefin blend component are fed to a second extruder or mixer wherein the blend is subjected to compounding conditions. Compounding conditions are implemented in the compounding zone of the second extruder or mixer and are tailored for mixtures of specific polyolefins and optionally additives. Temperature, pressure, and shear force conditions are implemented in the second extruder or mixer sufficient to provide intimate mixing of the processed LDPE recyclate and the virgin LDPE and optionally additives to produce a substantially homogeneous polymer blend of the processed LDPE recyclate and the virgin LDPE. In some embodiments, compounding conditions comprise a temperature in the compounding zone of less than or equal to 300° C., less than or equal to 250° C. or less than or equal to 200° C. In some embodiments, temperatures in the compounding zone can be in the range of from 125° C. to 195° C., from 130° C. to 180° C., or from 135° C. to 165° C.

Blends of Processed LDPE Recyclate and a Polyolefin Blend Component

In some embodiments, the blend comprises from 5 wt. % to 90 wt. %, 10 wt. % to 80 wt. %, 15 wt. % to 70 wt. %, 20 wt. % to 60 wt. %, or 25 wt. % to 50 wt. %, of a processed LDPE recyclate and from 10 wt. % to 95 wt. %, 20 wt. % to 90 wt. %, 30 wt. % to 85 wt. %, 40 wt. % to 80 wt. %, or 50 wt. % to 75 wt. %, of a polyolefin blend component, respectively, wherein all weight percentages are based on the combined weight of the polymer blend. In some embodiments, the virgin LDPE is visbroken. Such visbreaking of virgin LDPE can be thermal visbreaking and/or peroxidation visbreaking. In some embodiments, such visbreaking conditions for a virgin LDPE consist of thermal visbreaking at a temperature above the melting point of the LDPE, greater than or equal to 300° C., or in the range of from 320° C. to 400° C., in the absence of or substantially in the absence of oxygen.

In some embodiments, the blends of processed LDPE recyclate and a polyolefin blend component, in combination with or independently of the blend ratios in the preceding paragraph, comprise a bimodal polymer, wherein the processed LDPE recyclate product has a weight average molecular weight ("$M_{w3}$"), the polyolefin blend component has a weight average molecular weight ("$M_{w4}$"); and $M_{w3}/M_{w4}$ is either less than or equal to 0.9, 0.8, 0.7, 0.6, or 0.5, or alternatively is greater than or equal to 1.1, 1.25, 1.5, 1.75, or 2.0.

Figure 3:
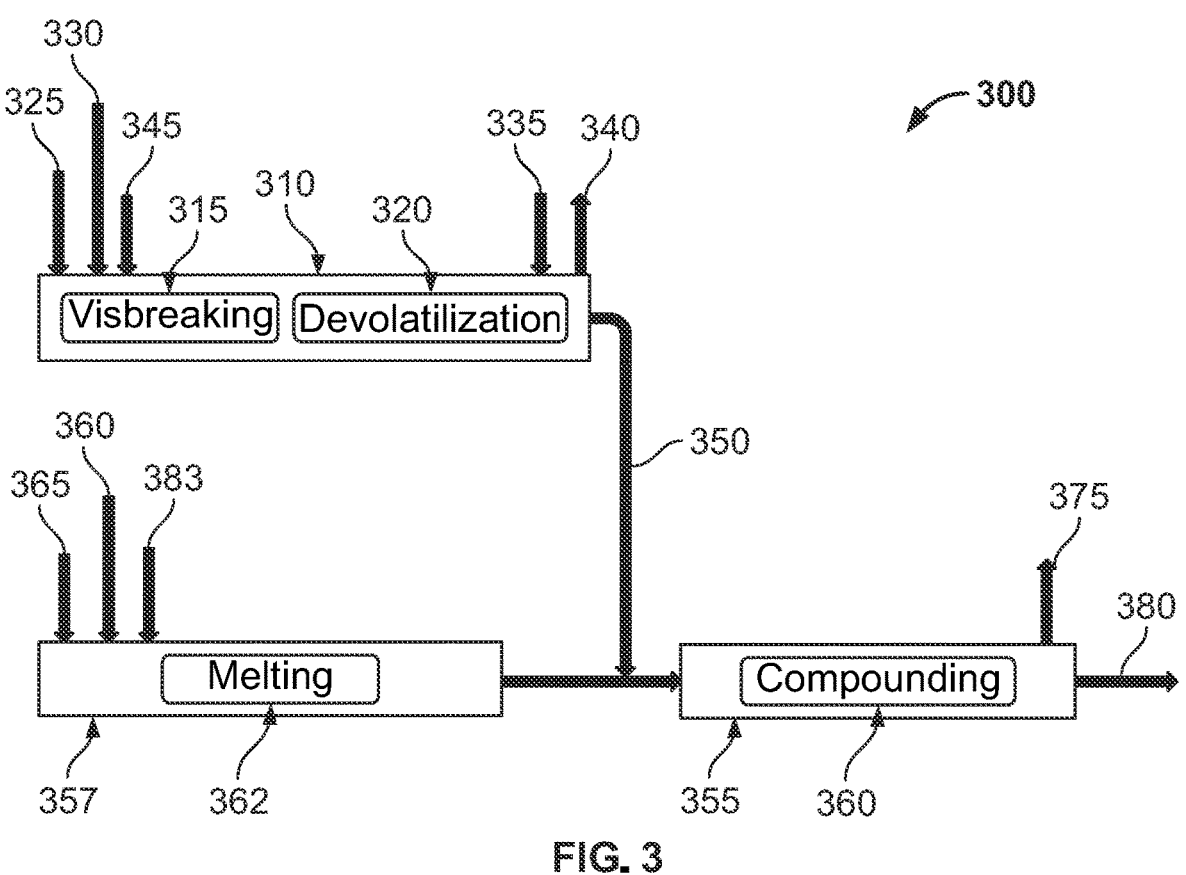
FIG. 3 is simplified flow diagram of the process to obtain a blend of a processed LDPE recyclate and a virgin LDPE using three extruders according to embodiments of the invention.

Blending of Processed LDPE Recyclate and a Polyolefin Blend Component-Three Extruders In FIG. 3, flow diagram 300 includes a visbreaking extruder 310, a melting extruder 357, and a compounding extruder 355. Embodiments of the present invention as shown in FIG. 3 include a visbreaking extruder 310 having a visbreaking zone 315 and a devolatilization zone 320. LDPE recyclate feedstock 325 is added to visbreaking extruder 310 proximate to the inlet end of the extruder. The LDPE recyclate feedstock 325 is drawn through the visbreaking extruder 310 by one or more rotating screw drives in the barrel of the visbreaking extruder 310. The length of the visbreaking extruder 310 is separated into one or more zones. Each zone can have one or more of a specified thread pitch on the screw drive, inlets for injection of gas 330, 335, vents or vacuum connections for withdrawal of gas 340, means for addition or withdrawal of heat, inlets for injection of peroxide 345, and inlets for injection of additives in order to impart preselected process conditions including, but not limited to pressure, temperature, and shear force.

FIG. 3 shows an embodiment with both a visbreaking zone 315 and a devolatilization zone 320. Other embodiments can have either a visbreaking zone 315 or a devolatilization zone 320 independently without the other. Process conditions in the visbreaking extruder 310 can further be controlled by rotation speed of the screw drive. Processed LDPE recyclate 350 is withdrawn proximate to the discharge of the visbreaking extruder 310 for further processing.

Embodiments of FIG. 3 include a second extruder 355 having a compounding zone 360 and a third extruder 357 having a melting zone 362. A third blend component 383 is added to melting extruder 357 proximate to the inlet end of the extruder optionally along with antioxidant agent 365 and other components 370. The polyolefin blend component 352 comprises a virgin polyolefin, a polyolefin recyclate feedstock, a processed polyolefin recyclate, or a combination thereof. In some embodiments, the virgin polyolefin comprises a virgin LDPE, a virgin LLDPE, a virgin HDPE, a virgin MDPE, a virgin polypropylene, or a combination thereof. In some embodiments, the polyolefin recyclate feedstock comprises a LDPE recyclate feedstock, a LLDPE recyclate feedstock, a HDPE recyclate feedstock, a MDPE recyclate feedstock, a polypropylene recyclate feedstock, or a combination thereof. In some embodiments, the processed polyolefin recyclate comprises a second processed LDPE recyclate, a processed LLDPE recyclate, a processed HDPE recyclate, a processed MDPE recyclate, a processed polypropylene recyclate, or a combination thereof. In some embodiments, a polyolefin blend component comprises a virgin LDPE, a LDPE recyclate feedstock, a processed LDPE recyclate, or a combination thereof. The mixture of third blend component 352 and optional antioxidant 365 and/or other components 370 is drawn through the melting extruder 357 by one or more rotating screw drives in the barrel of the melting extruder 357. The length of the melting extruder 357 can be separated into one or more zones. Each zone can have one or more of a specified thread pitch on the screw drive, means for addition or withdrawal of heat, inlets for injection of additives, and vents or vacuum connections for withdrawal of gas, in order to impart preselected process conditions including, but not limited to, pressure, temperature, and shear force. A melt of the polyolefin blend component 352 is withdrawn proximate to the discharge of the melting extruder 357 for further processing or pelletization.

Processed LDPE recyclate 350 is added to compounding extruder 355 proximate to the inlet end of the extruder along with the melt of the polyolefin blend component 352. The mixture of processed LDPE recyclate 350 and polyolefin blend component 352 is drawn through the compounding extruder 355 by one or more rotating screw drives in the barrel of the compounding extruder 355 and the mixture is subjected to compounding conditions. The length of the compounding extruder 355 can be separated into one or more zones. Each zone can have one or more of a specified thread pitch on the screw drive, means for addition or withdrawal of heat, inlets for injection of additives, and vents and/or vacuum connections for withdrawal of gas 375, in order to impart preselected process conditions including, but not limited to pressure, temperature, and shear force. A blend 380 of the processed LDPE recyclate 350 and the polyolefin blend component 352 melt is withdrawn proximate to the discharge of the compounding extruder 355 for further processing or pelletization.

In some embodiments, the polyolefin blend component can be a polyolefin powder product from a polymerization apparatus, a pelletized polyolefin, or the polyolefin melt, which is the product withdrawn from a third extruder. In some of these embodiments, the polymerization apparatus comprises two, three, or more polymerization reactors and/ or two, three, or more polymerization zones within a polymerization reactor. More specific polymerization apparatus embodiments include, but are not limited to, two or three gas phase fluidized-bed reactors in series, two or three slurry phase reactors in series, and a gas phase fluidized-bed reactor in series with a multizone circulation reactor.

In some embodiments, the amount of the polyolefin blend component, which itself can comprise two or more polymers, is determined based on the logarithmic mixing rule, wherein blend components satisfy the following equation:

$$\log(MFR_{blend}) = \sum_{i=1}^{n} (w_i \times \log(MFR_i))$$

wherein:

MFR is $I_2$, $I_{21}$, or other selected melt index;

$MFR_{blend}$ is the target MFR of the final blend product;

n is the number of components in the blend; and i is the i-th component of an n-component blend.

Blend Components

A first blend component is a processed LDPE recyclate produced from at from a visbreaking extruder. A second blend component comprises a virgin polyolefin, a polyolefin recyclate feedstock, a processed polyolefin recyclate, or a combination thereof. In some embodiments, the virgin polyolefin comprises a virgin LDPE, a virgin LLDPE, a virgin HDPE, a virgin MDPE, a virgin polypropylene, or a combination thereof. In some embodiments, the polyolefin recyclate feedstock comprises a LDPE recyclate feedstock, a LLDPE recyclate feedstock, a HDPE recyclate feedstock, a MDPE recyclate feedstock, a polypropylene recyclate feedstock, or a combination thereof. In some embodiments, the processed polyolefin recyclate comprises a second processed LDPE recyclate, a processed LLDPE recyclate, a processed HDPE recyclate, a processed MDPE recyclate, a processed polypropylene recyclate, or a combination thereof. In some embodiments, the second blend component comprises a virgin LDPE, a LDPE recyclate feedstock, a processed LDPE recyclate, or a combination thereof. When the processed LDPE recyclate is blended with another processed LDPE recyclate, the first LDPE recyclate will have at least one parameter that distinguishes it from the second processed LDPE recyclate.

Virgin LDPE

In some embodiments, LDPE recyclate feedstock is selected from ethylene homopolymers, copolymers of units derived from ethylene and units derived from one or more of $C_3$-$C_{12}$ α-olefins, copolymers of units derived from ethylene and units derived from one or more of alpha mono-olefins comprising polar groups, or mixtures thereof.

Such ethylene homopolymers can be produced in a high pressure, free-radical polymerization process, such as in one or more tubular reactors, one or more autoclave reactors, or a combination thereof. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and $C_3$-$C_{12}$ α-olefins can be produced in a high pressure, free-radical polymerization process, such as in one or more tubular reactors, one or more autoclave reactors, or a combination thereof. Such $C_3$-$C_{12}$ α-olefins include, but are not limited to, substituted or unsubstituted $C_3$ to $C_{12}$ alpha olefins such as propylene, butene, pentene, hexene, heptene, octene, nonene, decene, undecene, dodecane, and isomers thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and one or more of alpha mono-olefins comprising polar groups can be produced in a high pressure, free-radical polymerization process, such as in one or more tubular reactors, one or more autoclave reactors, or a combination thereof. Such alpha mono-olefins comprising polar groups include, but are not limited to, methacrylic acids, esters, nitriles, and amides, such as acrylic acid, methacrylic acid, cyclohexyl methacrylate, methyl acrylate, acrylonitrile, acrylamide, or mixtures thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Virgin LDPE can be characterized by having:

i) a density in the range of from 0.910 g/cm³ to 0.940 g/cm³ or from 0.915 g/cm³ to 0.935 g/cm³;

ii) a melt index (2.16 kg, 190° C.) in the range of from 1.0 g/10 min. to 100 g/10 min., from 2.0 g/10 min. to 80 g/10 min., or from 3.0 g/10 min. to 50 g/10 min.;

iii) a molecular weight distribution ($M_w/M_n$) greater than 15; and iv) a weight average molecular weight less than or equal to 250,000 daltons, less than or equal to 200,000 daltons, less than or equal to 150,000 daltons, or less than or equal to 100,000 daltons.

LDPE Recyclate Feedstock

In some embodiments, LDPE recyclate feedstock is derived from ethylene homopolymers, copolymers of units derived from ethylene and units derived from one or more of $C_3$-$C_{12}$ α-olefins, copolymers of units derived from ethylene and units derived from one or more of alpha mono-olefins comprising polar groups, or mixtures thereof. LDPE recyclate feedstock can be derived as a portion of post-consumer recycled polyolefin and/or post-industrial recycled polyolefin that is predominately comprised of LDPE recyclate, wherein "predominately" means greater than or equal to 80 wt %, greater than or equal to 85 wt %, greater than or equal to 90 wt %, or greater than or equal to 95 wt %, based on the total weight of the LDPE recyclate feedstock.

Such ethylene homopolymers can be produced in a high pressure, free-radical polymerization process, such as in one or more tubular reactors, one or more autoclave reactors, or a combination thereof. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and $C_3$-$C_{12}$ α-olefins can be produced in a high pressure, free-radical polymerization process, such as in one or more tubular reactors, one or more autoclave reactors, or a combination thereof. Such $C_3$-$C_{12}$ α-olefins include, but are not limited to, substituted or unsubstituted $C_3$ to $C_{12}$ alpha olefins such as propylene, butene, pentene, hexene, heptene, octene, nonene, decene, undecene, dodecane, and isomers thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

Such copolymers of ethylene and one or more of alpha mono-olefins comprising polar groups can be produced in a high pressure, free-radical polymerization process, such as in one or more tubular reactors, one or more autoclave reactors, or a combination thereof. Such alpha mono-olefins comprising polar groups include, but are not limited to, methacrylic acids, esters, nitriles, and amides, such as acrylic acid, methacrylic acid, cyclohexyl methacrylate, methyl acrylate, acrylonitrile, acrylamide, or mixtures thereof. When present, comonomers can be present in amounts up to 15 wt %, 10 wt %, or 5 wt %. Operating conditions for the high-pressure process can include, but are not limited to, a pressure in the range of from 70 MPa to 700 MPa and a temperature in the range of from 150° C. to 500° C. Such homopolymers have a high degree of long-chain branching and a density in the range of from 0.910 g/cm³ to 0.940 g/cm³.

LDPE recyclate feedstock, derived from LDPE as described above, can be characterized by having:

i) a density in the range of from 0.910 g/cm³ to 0.940 g/cm³ or from 0.915 g/cm³ to 0.935 g/cm³;

ii) a melt index (2.16 kg, 190° C.) less than or equal to 5.0 g/10 min., less than or equal to 1.0 g/10 min., less than or equal to 0.5 g/10 min., less than or equal to 0.2 g/10 min., or less than or equal to 0.1 g/10 min.;

iii) a molecular weight distribution ($M_w/M_n$) greater than 4.0, greater than 8.0, or greater than 15, and/or less than 35, less than 30, or less than 25;

iv) a weight average molecular weight greater than or equal to 85,000 daltons, greater than or equal to 120,000 daltons, greater than or equal to 180,000 daltons, or greater than or equal to 200,000 daltons, and/or less than or equal to 500,000 daltons, less than or equal to 400,000 daltons, less than or equal to 350,000 daltons, or less than or equal to 250,000 daltons; and v) a melt elasticity ("ER") greater than or equal to 1.0, greater than or equal to 1.4, or greater than or equal to 2.0.

In some embodiments, in addition to the foregoing properties, the LDPE recyclate feedstock can be further characterized by having one or more of:

vi) a first VOC content;

vii) a first high load melt index ($I_{21}$, 21.6 kg, 190° C.;

viii) a first melt index ratio (MIR, $I_{21}/I_2$);

ix) a first long chain branching parameter (g') in the range of from 0.40 to 0.75;

x) a first overall polydispersity ratio (PDR);

xi) a first complex viscosity ratio ($\eta^*_{0.1}/\eta^*_{100}$); and xii) a first intrinsic viscosity.

Processed LDPE Recyclate

A processed LDPE recyclate is withdrawn from the discharge of the visbreaking extruder, wherein "processed" means that the LDPE recyclate feedstock was subjected to visbreaking conditions or visbreaking conditions followed by devolatilization conditions. Processed LDPE recyclate, as described above, can be characterized by having:

i) a density, wherein the ratio of the density of the processed LDPE recyclate to the density of the LDPE recyclate feedstock is greater than or equal to 1.0;

ii) a melt index, wherein the ratio of the melt index of the processed LDPE recyclate to the melt index of the LDPE recyclate feedstock is greater than or equal to 5.0; and iii) a molecular weight distribution, wherein the ratio of molecular weight distribution of the processed LDPE recyclate to the molecular weight distribution of the LDPE recyclate feedstock is in the range of from 0.60 to 0.99 or from 0.75 to 0.95;

iv) a weight average molecular weight ("$M_{w2}$"), wherein the ratio of the weight average molecular weight of the processed LDPE recyclate to the weight average molecular weight of the LDPE recyclate feedstock is in the range of from 0.60 to 0.99 or from 0.75 to 0.95; and v) a melt elasticity ("ER"), wherein the ratio of the ER of the processed LDPE recyclate to the ER of the LDPE recyclate feedstock is in the range of from 0.30 to 0.90.

In some embodiments, in addition to the foregoing properties, the processed LDPE recyclate can be further characterized by having one or more of:

vi) a VOC content, wherein the ratio of the VOC content of the processed LDPE recyclate to the VOC content of the LDPE recyclate feedstock is less than or equal to 0.9, 0.8, 0.7, 0.6, or 0.5, each alone or in combination with a lower limit of greater than or equal to 0.1;

vii) a high load melt index ($I_{21}$, 21.6 kg, 190° C.), wherein the ratio of the high load melt index of the processed LDPE recyclate to the high load melt index of the LDPE recyclate feedstock is greater than or equal to 2.0;

viii) a melt index ratio (MIR, $I_{21}/I_2$), wherein the MIR of the processed LDPE recyclate to the MIR of the LDPE recyclate feedstock is in the range of from 0.50 to 0.75;

ix) a long chain branching parameter (g'), wherein the ratio of the g' of the processed LDPE recyclate to the g' of the LDPE recyclate feedstock is greater than or equal to 1.0;

x) an overall polydispersity ratio (PDR), wherein the ratio of the PDR of the processed LDPE recyclate to the PDR of the LDPE recyclate feedstock is less than or equal to 0.5;

xi) a complex viscosity ratio ($\eta^*_{0.1}/\eta^*_{100}$), wherein the ratio of the complex viscosity ratio of the processed LDPE recyclate to the complex viscosity ratio of the LDPE recyclate feedstock is less than or equal to 0.4, and/or the second complex viscosity is less than or equal to 12, and $\eta^*_{0.1}$ is the complex viscosity at 0.1 rad/sec and $\eta^*_{100}$ is the complex viscosity at 100 rad/sec, both at a temperature of 190° C.; and xii) an intrinsic viscosity [$\eta$], wherein the ratio of the intrinsic viscosity of the processed LDPE recyclate to the intrinsic viscosity of the LDPE recyclate feedstock is less than or equal to 0.85.

Melting Extruder

The polyolefin blend component and optional antioxidants and/or other components are fed to a third extruder or mixer wherein the blend is subjected to melting conditions. Melting conditions are implemented in the meting zone of the third extruder or mixer and are tailored for mixtures of specific polyolefins and optionally additives. Temperature, pressure, and shear force conditions are implemented in the second extruder or mixer sufficient to provide intimate mixing of the processed LDPE recyclate and the virgin LDPE and optionally additives to produce a substantially homogeneous polymer blend of the processed LDPE recyclate and the virgin LDPE. In some embodiments, melting conditions comprise a temperature in the melting zone in the range of from 130° C. to 250° C. or from 150° C. to 230° C.

Compounding Extruder

Processed LDPE recyclate and a polyolefin blend component are fed to a second extruder or mixer wherein the blend is subjected to compounding conditions. Compounding conditions are implemented in the compounding zone of the second extruder or mixer and are tailored for mixtures of specific polyolefins and optionally additives. Temperature, pressure, and shear force conditions are implemented in the second extruder or mixer sufficient to provide intimate mixing of the processed LDPE recyclate and the virgin LDPE and optionally additives to produce a substantially homogeneous polymer blend of the processed LDPE recyclate and the virgin LDPE. In some embodiments, compounding conditions comprise a temperature in the compounding zone of less than or equal to 300° C., less than or equal to 250° C. or less than or equal to 200° C. In some embodiments, temperatures in the compounding zone can be in the range of from 125° C. to 195° C., from 130° C. to 180° C., or from 135° C. to 165° C.

Blends of Processed LDPE Recyclate and a Polyolefin Blend Component

In some embodiments, the blend comprises from 5 wt. % to 90 wt. %, 10 wt. % to 80 wt. %, 15 wt. % to 70 wt. %, 20 wt. % to 60 wt. %, or 25 wt. % to 50 wt. %, of a processed LDPE recyclate and from 10 wt. % to 95 wt. %, 20 wt. % to 90 wt. %, 30 wt. % to 85 wt. %, 40 wt. % to 80 wt. %, or 50 wt. % to 75 wt. %, of a polyolefin blend component, respectively, wherein all weight percentages are based on the combined weight of the polymer blend. In some embodiments, the virgin LDPE is visbroken. Such visbreaking of virgin LDPE can be thermal visbreaking and/or peroxidation visbreaking. In some embodiments, such visbreaking conditions for a virgin LDPE consist of thermal visbreaking at a temperature above the melting point of the LDPE, greater than or equal to 300° C., or in the range of from 320° C. to 400° C., in the absence of or substantially in the absence of oxygen.

In some embodiments, the blends of processed LDPE recyclate and a polyolefin blend component, in combination with or independently of the blend ratios in the preceding paragraph, comprise a bimodal polymer, wherein the processed LDPE recyclate product has a weight average molecular weight ("$M_{w3}$"), the polyolefin blend component has a weight average molecular weight ("$M_{w4}$"); and $M_{w3}/M_{w4}$ is either less than or equal to 0.9, 0.8, 0.7, 0.6, or 0.5, or alternatively is greater than or equal to 1.1, 1.25, 1.5, 1.75, or 2.0.

Certain Embodiments

In some embodiments, a method for processing low density polyethylene (LDPE) recyclate comprises providing a LDPE recyclate feedstock, adding the LDPE recyclate to a first extruder to produce a first LDPE recyclate melt, and subjecting the first LDPE recyclate melt to visbreaking conditions to produce a second LDPE recyclate melt. The LDPE recyclate feedstock has: a first density in the range of from 0.910 g/cm³ to 0.940 g/cm³ or from 0.915 g/cm³ to 0.935 g/cm³; a first melt index (2.16 kg, 190° C.) less than or equal to 5.0 g/10 min., less than or equal to 1.0 g/10 min., less than or equal to 0.5 g/10 min., less than or equal to 0.2 g/10 min., or less than or equal to 0.1 g/10 min.; a first molecular weight distribution ($M_w/M_n$) greater than 4.0, greater than 8.0, or greater than 15, and/or less than 35, less than 30, or less than 25; a first weight average molecular weight ("$M_{w1}$") greater than or equal to 85,000 daltons, greater than or equal to 120,000 daltons, greater than or equal to 180,000 daltons, or greater than or equal to 200,000 daltons, and/or less than or equal to 500,000 daltons, less than or equal to 400,000 daltons, less than or equal to 350,000 daltons, or less than or equal to 250,000 daltons; and a first melt elasticity ("ER") greater than or equal to 1.0, greater than or equal to 1.4, or greater than or equal to 2.0.

The second LDPE recyclate melt has: a second density, wherein the ratio of the second density to the first density is greater than or equal to 1.0; a second melt index, wherein the ratio of the second melt index to the first melt index is greater than or equal to 5.0; a second molecular weight distribution, wherein the ratio of second molecular weight distribution to the first molecular weight distribution is in the range of from 0.60 to 0.99 or from 0.75 to 0.95; a second weight average molecular weight ("$M_{w2}$"), wherein $M_{w2}/M_{w1}$ is in the range of from 0.60 to 0.99 or from 0.75 to 0.95; and a second melt elasticity, wherein the ratio of the second melt elasticity to the first melt elasticity is in the range of 0.30 to 0.90 and/or the second melt elasticity is less than 1.0.

In further embodiments, the method is additionally characterized by one or more of the following:

a) the LDPE recyclate feedstock comprises post-consumer recycled waste, post-industrial recycled waste, or a combination thereof;

b) the visbreaking conditions consist of thermal visbreaking, which in some instances is performed at a temperature greater than or equal to 300° C., or at a temperature in the range of from 320° C. to 400° C.;

c) the first LDPE recyclate melt is further subjected to devolatilization conditions to produce the second LDPE recyclate melt, wherein the LDPE recyclate feedstock has a first volatile organic compound content, the first LDPE recyclate melt has a second volatile organic compound content, and the ratio of the second volatile organic compound content to the first volatile organic compound content is less than or equal to 0.9, and in some instances, the devolatilization conditions further comprise:

i) injection and withdrawal of a scavenging gas, and in some instances the scavenging gas comprises nitrogen, carbon-dioxide, water, or combinations thereof, ii) vent conditions, vacuum conditions, or a combination thereof, d) the second LDPE recyclate melt is passed through a melt filter;

e) an antioxidant agent is added to the first extruder; and f) the LDPE recyclate feedstock has a first high load melt index (21.6 kg, 190° C.), the second LDPE recyclate melt has a second high load melt index, and the ratio of the second high load melt index to the first high load melt index is greater than or equal to 2.0;

g) the LDPE recyclate feedstock has a first melt index ratio ($I_{21}/I_2$), the second LDPE recyclate melt has a second melt index ratio, and the ratio of the second melt index ratio to the first melt index ratio is in the range of 0.50 to 0.75;

h) the LDPE recyclate feedstock has a first long chain branching parameter (g'), the second LDPE recyclate melt has a second g', and the ratio of the second g' to the first g' is greater than or equal to 1.0, and/or the processed LDPE recyclate has a g' in the range of from 0.40 to 0.75;

i) the LDPE recyclate feedstock has an overall polydispersity measure ("PDR") in the range from 0.40 to 0.75, the second LDPE recyclate melt has a second PDR, and the ratio of the second PDR to the first PDR is less than or equal to 0.5;

j) the LDPE recyclate feedstock has a first complex viscosity ratio ($\eta^*_{0.1}/\eta^*_{100}$), the second LDPE recyclate melt has a complex viscosity ratio, and the ratio of the second complex viscosity ratio to the first complex viscosity ratio is less than or equal to 0.4, and/or the second complex viscosity is less than or equal to 12; and k) the LDPE recyclate feedstock has a first intrinsic viscosity, the second LDPE recyclate melt has a intrinsic viscosity, and the ratio of the second intrinsic viscosity to the first intrinsic viscosity is less than or equal to 0.85.

In some embodiments, the foregoing method further comprises forming a LDPE recyclate product by withdrawal of the second LDPE recyclate melt from the first extruder for further processing or pelletizing of the second LDPE recyclate melt.

In further embodiments of the foregoing method, the LDPE recyclate product and a first polyolefin blend component are added to a second extruder, and compounding conditions are effected in the second extruder to form a polyolefin product comprising the melt-blended mixture of the processed LDPE recyclate product and the first polyolefin blend component. In some embodiments, such compounding condition include a temperature less than or equal to 300° C. In some embodiments, the first polyolefin blend component comprises a virgin polyolefin, a polyolefin recyclate feedstock, a processed polyolefin recyclate, or a combination thereof. In yet further embodiments: the virgin polyolefin comprises a virgin LDPE, a virgin LLDPE, a virgin HDPE, a virgin MDPE, a virgin polypropylene, or a combination thereof; the polyolefin recyclate feedstock comprises a LDPE recyclate feedstock, a LLDPE recyclate feedstock, a HDPE recyclate feedstock, a MDPE recyclate feedstock, a polypropylene recyclate feedstock, or a combination thereof; and the processed polyolefin recyclate comprises a second processed LDPE recyclate, a processed LLDPE recyclate, a processed HDPE recyclate, a processed MDPE recyclate, a processed polypropylene recyclate, or a combination thereof. In some embodiments, the first polyolefin blend component comprises a virgin LDPE, a LDPE recyclate feedstock, a processed LDPE recyclate, or a combination thereof.

In further embodiments of the foregoing method, the LDPE recyclate product: is added in an amount in the range of from 5 wt. % to 90 wt. %, or from 20 wt. % to 60 wt. %, based on the combined weight of the LDPE recyclate product and the first polyolefin blend component; and/or the LDPE recyclate product has third weight average molecular weight ("$M_{w3}$"), the first polyolefin blend component has a fourth weight average molecular weight ("$M_{w4}$"), and the $M_{w3}/M_{w3}$ is either less than or equal to 0.8 or greater than or equal to 1.25.

In further embodiments of the foregoing method, the first polyolefin blend component is a first virgin LDPE comprising a polymer product prepared in a first polymerization apparatus, wherein in some instances, the polymer product was subjected to a visbreaking process after polymerization, and in some embodiments, the visbreaking process comprises thermal visbreaking, peroxide visbreaking, or a combination thereof.

In further embodiments of the foregoing method, the first polyolefin blend component comprises a polyolefin powder prepared in a first polymerization apparatus.

In further embodiments of the foregoing method, an antioxidant agent is added to the second extruder.

In further embodiments of the foregoing method, the method further comprises: adding a second polyolefin blend component to a third extruder; effecting melt conditions in the third extruder to produce a second polyolefin blend component melt; and withdrawing the second polyolefin blend component melt as the first polyolefin blend component.

In further embodiments of the foregoing method, the second polyolefin blend component comprises a virgin LDPE, a LDPE recyclate feedstock, a processed LDPE recyclate, or a combination thereof.

In further embodiments of the foregoing method, the second polyolefin blend component is subjected to a visbreaking process after polymerization, wherein in some instances, the visbreaking process consists of thermal visbreaking.

In further embodiments of the foregoing method, the second polyolefin blend component comprises polyethylene powder prepared in a second polymerization apparatus and/or polyethylene pellets.

In further embodiments of the foregoing method, the first and/or second polymerization apparatus each comprise two more polymerization reactors and/or two or more polymerization zones within a polymerization reactor.

In further embodiments of the foregoing method, the first and/or second polymerization apparatuses each comprise two or more gas phase fluidized-bed reactors in series, two or more slurry phase reactors in series, or a gas phase fluidized-bed reactor in series with a multizone circulation reactor.

In further embodiments of the foregoing method, an antioxidant agent is added to the third extruder.

In some embodiments, a composition comprise a polymer blend of a first polymer and a second polymer. The first polymer is a first processed LDPE recyclate and is present in an amount in the range of from 5 wt. % to 90 wt. %. The second polymer is a virgin polyolefin, a polyolefin recyclate feedstock, a processed polyolefin recyclate, or a combination thereof, and is present in an amount in the range of from 10 wt. % to 95 wt. %. All weight percentages are based on the combined weight of the first and second polymers.

In further embodiments of the foregoing composition: the virgin polyolefin comprises a virgin LDPE, a virgin LLDPE, a virgin HDPE, a virgin MDPE, a virgin polypropylene, or a combination thereof, the polyolefin recyclate feedstock comprises a LDPE recyclate feedstock, a LLDPE recyclate feedstock, a HDPE recyclate feedstock, a MDPE recyclate feedstock, a polypropylene recyclate feedstock, or a combination thereof, and the processed polyolefin recyclate comprises a second processed LDPE recyclate, a processed LLDPE recyclate, a processed HDPE recyclate, a processed MDPE recyclate, a processed polypropylene recyclate, or a combination thereof.

In further embodiments of the foregoing composition, processed means subjected to thermal visbreaking or subjected to thermal visbreaking and devolatilization.

In some embodiments, a blend comprises a visbroken LDPE, having a first $I_2$ and a virgin LDPE, a LDPE recyclate feedstock, a processed LDPE recyclate, or a combination thereof, having a second $I_2$, wherein:

$$\log((I_2)_{blend}) = \sum_{i=1}^{n}(w_i \times \log((I_2)_i))$$

$(I_2)_{blend}$ is the target melt index of the final blend product;
n is the number of components in the blend; and
i is the i-th component of an n-component blend.

In another aspect, foams comprising the processed LDPE recyclate, as disclosed herein, can be produced via a chemical blowing process or via a physical blowing process. Physically blown polyolefin foam is commonly produced with blowing agents such as isobutane, pentane and cyclopentane. In general, physically blown polyolefin foams have the advantage that they yield in a higher expansion and thus in a lower density compared to chemically blown polyolefin foams. In some embodiments, prior to blowing the processed LDPE recyclate can be blended with up to 50 wt % of a HDPE, a MDPE, a LLDPE, a LDPE, or a combination thereof. Processed LDPE recyclate, either alone or in combination with such other polymers, provides compositions suitable for making uncrosslinked or crosslinked low density polyethylene foam, and to embodiments of uncrosslinked low density polyethylene foams. In some embodiments, the foaming precursor composition comprising the processed LDPE recyclate comprises a nucleating agent to increase the cell density and to modify the dynamics of bubble formation and growth. In some embodiments, foams comprising the processed LDPE recyclate have a density in the range of from 15 kg/m³ to 60 kg/m³. Such foams may be used in protective packaging for electronics, furniture, fruits, glass items, toys, among other things, or with any other article where cushioning protection from shock and/or vibration is desired. The compositions and/or foams may also be used in protective packaging for articles where insulation from heat is desired. Foams comprising the processed LDPE recyclate can be further characterized by average cell size, open cell content (measured in accordance with ASTM D6226-15), compressive strength (measured in accordance with ASTM D3575-14, Suffix D), thermal insulation K-factor (measured in accordance with GBT 3399-1982). In some embodiments a foam is formed by physically and/or chemically blowing a composition comprising a processed LDPE recyclate, and optionally up to 5 wt %, up to 10 wt %, up to 20 wt %, or up to 50 wt % of a virgin polyolefin. In some embodiments, the virgin polyolefin comprises a virgin LDPE, a virgin LLDPE, a virgin HDPE, a virgin MDPE, a virgin polypropylene, or a combination thereof.

The following examples illustrate the invention; however, those skilled in the art will recognize numerous variations within the spirit of the invention and scope of the claims. To facilitate a better understanding of the present invention, the following examples of preferred embodiments are given. In no way should the following examples be read to limit, or to define, the scope of the invention.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following examples use commercial LDPE compositions having a low melt index as proxies for LDPE recyclate feedstocks. After processing, as described herein, the visbroken low melt index LDPEs, either alone or in blends with other components, are compared to higher melt index virgin LDPEs.

Test Methods

Densities are determined in accordance with ASTM D-4703 and ASTM D-1505/ISO-1183.

High load melt index ("I21") was determined by ASTM D-1238-F (190° C./21.6 kg).

Shear rheological measurements are performed in accord with ASTM 4440-95a, which characterize dynamic viscoelastic properties (storage modulus, G', loss modulus, G" and complex viscosity, $\eta^*$, as a function of oscillation frequency, ($\omega$). A rotational rheometer (TA Instruments) is used for the rheological measurements. A 25 mm parallelplate fixture was utilized. Samples were compression molded in disks (~29 mm diameter and ~1.3 mm thickness) using a hot press at 190° C. An oscillatory frequency sweep experiment (from 398.1 rad/s to 0.0251 rad/s) was applied at 190° C. The applied strain amplitude is ~10% and the operating gap is set at 1 mm. Nitrogen flow was applied in the sample chamber to minimize thermal oxidation during the measurement.

Melt elasticity ("ER") is determined as discussed in R. Shroff and H. Mavridis, "New Measures of Polydispersity from Rheological Data on Polymer Melts." J. Applied Polymer Science 57 (1995) 1605. See also U.S. Pat. Nos. 7,238,754, 6,171,993 and 5,534,472 (col. 10, lines 20-30), the teachings of which are incorporated herein by reference. Thus, storage modulus (G') and loss modulus (G") are measured. The nine lowest frequency points are used (five points per frequency decade) and a linear equation is fitted by least-squares regression to log G' versus log G". ER is then calculated from:

$$ER=(1.781\times10^{-3})\times G'$$

at a value of G"=5,000 dyn/cm². The same procedure and equation for the ER calculation was used for both linear and long-chain-branched polyolefins.

PDR, or "Overall Polydispersity Measure" is determined as discussed in R. Shroff and H. Mavridis, "New Measures of Polydispersity from Rheological Data on Polymer Melts," J. Applied Polymer Science 57 (1995) 1605, equation 27 on page 1619, with $G^*_{ref,1}=1.95*10^4$ dyn/cm² and $\log_{10}$ $(G^*_{ref,3}/G^*_{ref,1})=2$ The same procedure and equation for the PDR calculation was used for both linear and long-chain-branched polyolefins.

The ratio $\eta^*_{0.1}/\eta^*_{100}$ of complex viscosities, $\eta^*_{0.1}$, at a frequency of 0.1 rad/sec and $\eta^*_{100}$, at a frequency of 100 rad/sec, is used as an additional measure of shear sensitivity and thus rheological breadth, or polydispersity, of the polymer melt.

Melt index ("I2") was determined by ASTM D-1238-E (190° C./2.16 kg).

Molecular weight distribution ("MWD") as well as the molecular weight averages (number-average molecular weight, $M_n$, weight-average molecular weight, $M_w$, and z-average molecular weight, $M_z$) are determined using a high temperature Polymer Char gel permeation chromatography ("GPC"), also referred to as size exclusion chromatography ("SEC"), equipped with a filter-based infrared detector, IR5, a four-capillary differential bridge viscometer, and a Wyatt 18-angle light scattering detector. $M_n$, $M_w$, $M_z$, MWD, and short chain branching (SCB) profiles are reported using the IR detector, whereas long chain branch parameter, g', is determined using the combination of viscometer and IR detector at 145° C. Three Agilent PLgel Olexis GPC columns are used at 145° C. for the polymer fractionation based on the hydrodynamic size in 1,2,4-trichlorobenzene (TCB) with 300 ppm antioxidant butylated hydroxytoluene (BHT) as the mobile phase. 16 mg polymer is weighted in a 10 mL vial and sealed for the GPC measurement. The dissolution process is obtained automatically (in 8 ml TCB) at 160° C. for a period of 1 hour with continuous shaking in an Agilent autosampler. 20 μL Heptane was also injected in the vial during the dissolution process as the flow marker. After the dissolution process, 200 μL solution was injected in the GPC column. The GPC columns are calibrated based on twelve monodispersed polystyrene (PS) standards (provided by PSS) ranging from 578 g/mole to 3,510,000 g/mole. The comonomer compositions (or SCB profiles) are reported based on different calibration profiles obtained using a series of relatively narrow polyethylene (polyethylene with 1-hexene and 1-octene comonomer were provided by Polymer Char, and polyethylene with 1-butene were synthesized internally) with known values of $CH_3/1000$ total carbon, determined by an established solution NMR technique. GPC one software was used to analyze the data. The long chain branch parameter, g', is determined by the equation:

$$g'=[\eta]/[\eta]_{1in}$$

where, $[\eta]$ is the average intrinsic viscosity of the polymer that is derived by summation of the slices over the GPC profiles as follows:

$$[\eta] = \frac{\sum_i c_i[\eta]_i}{\sum_i c_i}$$

where $c_i$ is the concentration of a particular slice obtained from IR detector, and $[\eta]_i$ is the intrinsic viscosity of the slice measured from the viscometer detector. $[\eta]_{1in}$ is obtained from the IR detector using Mark-Houwink equation $$\left([\eta]_{lin} = \sum KM_i^{\alpha}\right)$$

for a linear high density polyethylene, where $M_i$ is the viscosity-average molecular weight for a reference linear polyethylene, K and $\alpha$ are Mark-Houwink constants for a linear polymer, which are K=0.000374, $\alpha$=0.7265 for a linear polyethylene and K=0.00041, $\alpha$=0.6570 for a linear polypropylene.

Volatile Organic Compounds ("VOC") is measured by pyrolysis-gas chromatography/mass spectrometry ("P-GC/MS") in parts per billion (ppb), parts per million (ppm), or and micrograms per cubic meter ($\mu g/m^3$).

Zero-shear viscosity, $\eta_0$, is determined using the Sabia equation fit of dynamic complex viscosity versus radian frequency, as described in of Shroff & Mavridis, (1999) "A Long Chain Branching Index for Essentially Linear Poly-ethylenes", Macromolecules, 32, 8454-8464 (with focus on Appendix B), the disclosure of which is fully incorporated by reference herein in its entirety.

Raw Materials

Raw materials used herein are shown in Table 1, below.

TABLE 1

|  | Use in Examples | Polymer Label | MFR (g/10 min)* | Density (g/cc) |
|---|---|---|---|---|
| Composition** |  |  |  |  |
| Petrothene ™ NA963083 LDPE | Proxy for LDPE recyclate feedstock | P1 | 0.62 | 0.923 |

*190° C./2.16 kg
**All materials available from LyondellBasell Industries NV

Examples 1-3

Examples 1-3 in TABLE 2 show the results of visbreaking a LDPE resin. P1 is believed to fairly represent an LDPE recyclate feedstock. Prior to processing, P1 (LDPE recyclate feedstock proxy) has a nominal density of 0.923 g/cm$^3$ and melt index $I_2$ of 0.62 g/10 min. Example 1 results in TABLE 2 show a number of other properties of P1.

Examples 2 and 3 were prepared by visbreaking portions of P1. Visbreaking was performed by feeding P1 into a Werner and Pfleiderer ZSK40 twin screw extruder at a feed rate of 50 pounds per hour, a screw speed of 600 rpm and with a target temperature profile of 200/250/325/325/325/325/325/325/325° C. (from feed inlet to die). The extrudate was comminuted to pellets. In Examples 2 and 3 different screw designs were used resulting in increased energy input into the polymer in the extruder in Example 3 versus Example 2. The visbroken P1 of Example 2 using the first extruder screw design is labeled P1-vb1, and the visbroken P1 of Example 3 using the second extruder screw design is labeled P1-vb2, in TABLE 2.

Example 2 shows that melt index $I_2$ of P1 is increased by visbreaking by a factor of 6.3, while density and long chain branching parameter g' increased only nominally. Example 3 shows that melt index $I_2$ of P1 is increased by visbreaking by a factor of 7.7, while long chain branching parameter g' increased only nominally. The larger increase in melt index $I_2$ in Example 3 as compared to Example 2 is attributed to specific energy ("SPE") input to the polymer of 0.499 kW·hr/kg in Example 3 versus 0.457 kW·hr/kg in Example 2.

Example 2 shows that high load melt index $I_{21}$ of P1 is increased by visbreaking by a factor of 3.9, thus producing a reduction of melt index ratio ($I_{21}/I_2$) from 81 to 51. Melt elasticity ("ER") is reduced by about one third in both Examples 2 and 3. Overall polydispersity measure ("PDR") is reduced by more than half for both Examples 2 and 3.

As compared to P1, complex viscosity $\eta_0$ is reduced by 90% and 92%, complex viscosity, $\eta^*_{0.1}$, is reduced by 80% and 83%, complex viscosity, $\eta^*_{100}$ is reduced by 94% and 95%, and complex viscosity ratio $\eta^*_{0.1}/\eta^*_{100}$ is reduced by 64% and 68%, in Examples 2 and 3, respectively. Intrinsic viscosity $[\eta]$ is reduced by 17% and 19%, in Examples 2 and 3, respectively.

As compared to P1, number average molecular weight ($M_n$) is reduced by 16% and 22%, weight average molecular weight ($M_w$) is reduced by 26% and 27%, and Z-average molecular weight ($M_z$) is reduced by 19% and 20%, in Examples 2 and 3, respectively. Molecular weight distribution ($M_w/M_n$) is reduced by 12% and 7%, and molecular weight ratio ($M_z/M_w$) is increased by 9% and 10%, in Examples 2 and 3, respectively.

TABLE 2

| Parameter | Units | Example 1 | Example 2 | Example 3 |
|---|---|---|---|---|
| Polymer Label | — | P1 | P1-vb1 | P1-vb2 |
| $I_2$ | g/10 min | 0.62 | 3.9 | 4.75 |
| $I_2$-vb/ $I_2$-original | — | n/a | 6.3 | 7.7 |
| Density | g/cc | 0.9227 | 0.9238 | — |
| $I_{21}$ | g/10 min | 50.2 | 197 | — |
| $I_{21}$-vb/ $I_{21}$-original | — | n/a | 3.9 | — |
| MIR ($I_{21}/I_2$) | — | 81 | 51 | — |
| ER | — | 2.37 | 1.59 | 1.53 |
| ER-vb/ ER-original | % | 100% | 67% | 65% |
| PDR | — | 77 | 31 | 26 |
| PDR-vb/ PDR-original | % | 100% | 40% | 34% |
| $\eta_0$ | poise | $4.26 \times 10^5$ | $4.44 \times 10^4$ | $3.59 \times 10^4$ |

TABLE 2-continued

| Parameter | Units | Example 1 | 2 | 3 |
|---|---|---|---|---|
| $\eta^*_{0.1}$ | poise | $1.78 \times 10^5$ | $3.55 \times 10^4$ | $2.98 \times 10^4$ |
| $\eta^*_{100}$ | poise | $6.39 \times 10^3$ | $3.61 \times 10^3$ | $3.42 \times 10^3$ |
| $\eta^*_{0.1}/\eta^*_{100}$ | — | 28 | 10 | 9 |
| $M_n$ | daltons | 16,600 | 14,000 | 13,000 |
| $M_w$ | daltons | 129,900 | 96,400 | 94,500 |
| $M_z$ | daltons | 396,500 | 320,600 | 318,100 |
| MWD $(M_w/M_n)$ | — | 7.8 | 6.9 | 7.3 |
| $M_z/M_w$ | — | 3.1 | 3.3 | 3.4 |
| $M_w$-vb/ $M_w$-original | — | — | 74% | 73% |
| $M_z$-vb/ $M_z$-original | — | — | 81% | 80% |
| $(M_z/M_w)$-vb/ $(M_z/M_w)$-orig. | — | — | 109% | 110% |
| Intrinsic Viscosity [η] | dl/g | 1.03 | 0.86 | 0.83 |
| g' (long chain branching parameter) | — | 0.61 | 0.63 | 0.62 |
| SPE | hp · hr/lb | — | 0.278 | 0.304 |
| | kW · hr/kg | — | 0.457 | 0.499 | vb = visbroken

Figure 4:
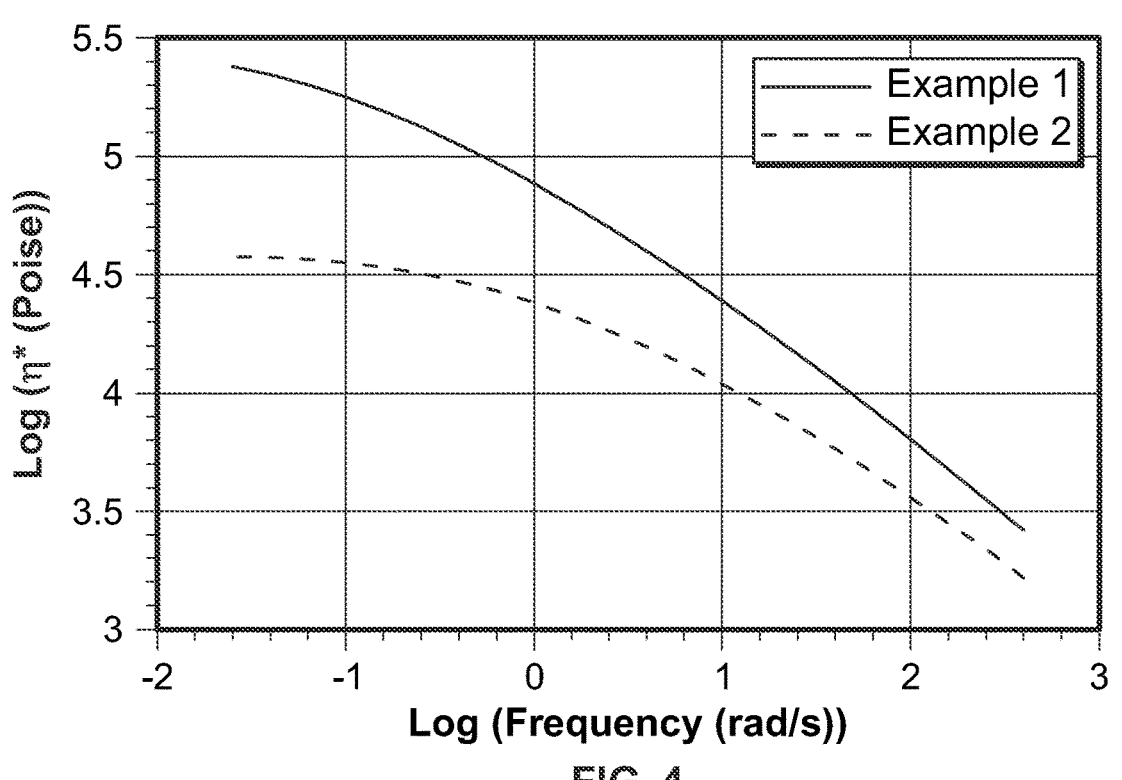
FIG. 4 is an overlaid graph showing the effects of visbreaking an LDPE on complex viscosity according to embodiments of the invention.

Dynamic oscillatory data generated based on analysis of samples of P1 and P1-vb are shown in TABLE 3 below. The data in TABLE 3 show that complex viscosity decreases as frequency increases for both P1 and P1-vb1. TABLE 3 further shows that visbreaking P1 results in a lower complex viscosity ($\eta^*$) for P1-vb1 for all tested values of frequency. Additionally, the difference in complex viscosity between P1 and P1-vb1 decreases as frequency increases. Applicant believes this to show, without wishing to be bound by any particular theory, that visbreaking has a bigger impact, that is more chain scission, on higher molecular weight chains in LDPE and further indicates a narrower MWD ($M_w/M_n$) for P1-vb1 as compared to P1. FIG. 4 shows a comparison of curves generated for Examples 1 and 2 from the data in TABLE 3. The overlaid graphs show the log of complex viscosity ($\eta^*$) in poise as a function of the log of the oscillatory frequency in radians per second.

TABLE 3

| Oscillation | | Example 1 (P1) | | Example 2 (P1-vb1) | | Complex Viscosity Reduction | |
|---|---|---|---|---|---|---|---|
| Freq. (rad/sec) | Log (freq.) | $\eta^*$ (poise) | log($\eta^*$) | $\eta^*$ (poise) | log($\eta^*$) | $\Delta\eta^*$ (poise) | $\Delta$log ($\eta^*$) |
| 0.0251 | −1.60 | 239,000 | 5.38 | 37,700 | 4.58 | 201,300 | 0.84 |
| 0.0398 | −1.40 | 221,000 | 5.34 | 37,400 | 4.57 | 183,600 | 0.83 |
| 0.0631 | −1.20 | 200,000 | 5.30 | 36,700 | 4.56 | 163,300 | 0.82 |
| 0.1000 | −1.00 | 178,000 | 5.25 | 35,500 | 4.55 | 142,500 | 0.80 |
| 0.158 | −0.80 | 155,000 | 5.19 | 34,000 | 4.53 | 121,000 | 0.78 |
| 0.251 | −0.60 | 133,000 | 5.12 | 32,000 | 4.51 | 101,000 | 0.76 |
| 0.398 | −0.40 | 112,000 | 5.05 | 29,600 | 4.47 | 82,400 | 0.74 |
| 0.631 | −0.20 | 93,400 | 4.97 | 27,000 | 4.43 | 66,400 | 0.71 |
| 1.000 | 0.00 | 76,700 | 4.88 | 24,100 | 4.38 | 52,600 | 0.69 |
| 1.58 | 0.20 | 62,300 | 4.79 | 21,200 | 4.33 | 41,100 | 0.66 |
| 2.51 | 0.40 | 50,000 | 4.70 | 18,300 | 4.26 | 31,700 | 0.63 |
| 3.98 | 0.60 | 39,800 | 4.60 | 15,700 | 4.20 | 24,100 | 0.61 |
| 6.31 | 0.80 | 31,500 | 4.50 | 13,200 | 4.12 | 18,300 | 0.58 |
| 10.00 | 1.00 | 24,500 | 4.39 | 10,900 | 4.04 | 13,600 | 0.56 |
| 15.8 | 1.20 | 19,000 | 4.28 | 8,970 | 3.95 | 10,030 | 0.53 |
| 25.1 | 1.40 | 14,600 | 4.16 | 7,270 | 3.86 | 7,330 | 0.50 |
| 39.8 | 1.60 | 11,200 | 4.05 | 5,820 | 3.76 | 5,380 | 0.48 |
| 63.1 | 1.80 | 8,470 | 3.93 | 4,620 | 3.66 | 3,850 | 0.45 |

TABLE 3-continued

| Oscillation | | Example 1 (P1) | | Example 2 (P1-vb1) | | Complex Viscosity Reduction | |
|---|---|---|---|---|---|---|---|
| Freq. (rad/sec) | Log (freq.) | $\eta^*$ (poise) | log($\eta^*$) | $\eta^*$ (poise) | log($\eta^*$) | $\Delta\eta^*$ (poise) | $\Delta$log ($\eta^*$) |
| 100 | 2.00 | 6,390 | 3.81 | 3,610 | 3.56 | 2,780 | 0.44 |
| 158 | 2.20 | 4,770 | 3.68 | 2,820 | 3.45 | 1,950 | 0.41 |
| 251 | 2.40 | 3,560 | 3.55 | 2,180 | 3.34 | 1,380 | 0.39 |
| 398 | 2.60 | 2,620 | 3.42 | 1,650 | 3.22 | 970 | 0.37 |

For the sake of brevity, only certain ranges are explicitly disclosed herein. However, in addition to recited ranges, any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the processes, machines, film structures, composition of layers, means, methods, and/or steps described in the specification. As one of the ordinary skill in the art will readily appreciate from the disclosure of the present invention, processes, machines, film structures, composition of layers, means, methods, and/or steps, presently existing or later to be developed that perform substantially the same function or achieve substantially the same result as the corresponding embodiments described herein, may be utilized according to the present invention. Accordingly, the appended claims are intended to include within their scope such processes, machines, film structures, composition of layers, means, methods, and/or steps.

What is claimed is:

1. A method for processing low density polyethylene (LDPE) recyclate comprising:

a. providing a LDPE recyclate feedstock having:

i) a first density in the range of from 0.910 g/cm$^3$ to 0.940 g/cm$^3$;

ii) a first melt index (12; 2.16 kg, 190° C.) less than or equal to 5.0 g/10 min;

iii) a first molecular weight distribution ($M_w/M_n$) greater than 4.0;

iv) a first weight average molecular weight ("$M_{w1}$") greater than or equal to 85,000 daltons; and v) a first melt elasticity ("ER") greater than or equal to 1.0;

b. adding the LDPE recyclate to a first extruder to produce a first LDPE recyclate melt;

c. subjecting the first LDPE recyclate melt to visbreaking conditions to produce a second LDPE recyclate melt having:

i) a second density, wherein the ratio of the second density to the first density is greater than or equal to 1.0;

ii) a second melt index, wherein the ratio of the second melt index to the first melt index is greater than or equal to 5.0;

iii) a second molecular weight distribution, wherein the ratio of second molecular weight distribution to the first molecular weight distribution is in the range of from 0.60 to 0.99;

iv) a second weight average molecular weight ("$M_{w2}$"), wherein $M_{w2}/M_{w1}$ is in the range of from 0.60 to 0.99; and v) a second melt elasticity, wherein the ratio of the second melt elasticity to the first melt elasticity is in the range of 0.30 to 0.90;

wherein a LDPE recyclate product is formed by withdrawal of the second LDPE recyclate melt from the first extruder, and further processing or pelletizing of the second LDPE recyclate melt d. adding the LDPE recyclate product and a first polyolefin blend component to a second extruder; and e. effecting compounding conditions in the second extruder to form a polyolefin product comprising the melt-blended mixture of the LDPE recyclate product and the first polyolefin blend component.

2. The method of claim 1, wherein the LDPE recyclate feedstock comprises post-consumer recycled waste, post-industrial recycled waste, or a combination thereof.

3. The method of claim 1, wherein the visbreaking conditions consist of thermal visbreaking.

4. The method of claim 3, wherein thermal visbreaking is performed at a temperature greater than or equal to 300° C.

5. The method of claim 1, further comprise subjecting the first LDPE recyclate melt to devolatilization conditions to produce the second LDPE recyclate melt wherein:

the LDPE recyclate feedstock has a first volatile organic compound content;

the first LDPE recyclate melt has a second volatile organic compound content; and the ratio of the second volatile organic compound content to the first volatile organic compound content is less than or equal to 0.9.

6. The method of claim 5, wherein devolatilization conditions comprise injection and withdrawal of a scavenging gas.

7. The method of claim 1, wherein the method is characterized by one or more of the following:

i) the LDPE recyclate feedstock has a first high load melt index ($I_{21}$; 21.6 kg, 190° C.), the second LDPE recyclate melt has a second high load melt index, and the ratio of the second high load melt index to the first high load melt index is greater than or equal to 2.0;

ii) the LDPE recyclate feedstock has a first melt index ratio ($I_{21}/I_2$), the second LDPE recyclate melt has a second melt index ratio, and the ratio of the second melt index ratio to the first melt index ratio is in the range of 0.50 to 0.75, wherein $I_{21}$ is the first high load melt index of the LLDPE recyclate feedstock;

iii) the LDPE recyclate feedstock has a first long chain branching parameter (g') in the range from 0.40 to 0.75, the second LDPE recyclate melt has a second g', and the ratio of the second g' to the first g' is greater than or equal to 1.0;

iv) the LDPE recyclate feedstock has an overall polydispersity measure ("PDR"), the second LDPE recyclate melt has a second PDR, and the ratio of the second PDR to the first PDR is less than or equal to 0.5;

v) the LDPE recyclate feedstock has a first complex viscosity ratio, the second LDPE recyclate melt has a second complex viscosity ratio, and the ratio of the second complex viscosity ratio to the first complex viscosity ratio is less than or equal to 0.40, and/or the second complex viscosity is less than or equal to 12; and vi) the LDPE recyclate feedstock has a first intrinsic viscosity, the second LDPE recyclate melt has a second intrinsic viscosity, and the ratio of the second intrinsic viscosity to the first intrinsic viscosity is less than or equal to 0.85.

8. The method of claim 1, wherein the first polyolefin blend component comprises a virgin polyolefin, a polyolefin recyclate feedstock, a processed polyolefin recyclate, or a combination thereof.

9. The method of claim 8, wherein:

a. the virgin polyolefin comprises a virgin LDPE, a virgin LLDPE, a virgin HDPE, a virgin MDPE, a virgin polypropylene, or a combination thereof;

b. the polyolefin recyclate feedstock comprises a LDPE recyclate feedstock, a LLDPE recyclate feedstock, a HDPE recyclate feedstock, a MDPE recyclate feedstock, a polypropylene recyclate feedstock, or a combination thereof; and c. the processed polyolefin recyclate comprises a second processed LDPE recyclate, a processed LLDPE recyclate, a processed HDPE recyclate, a processed MDPE recyclate, a processed polypropylene recyclate, or a combination thereof.

10. The method of claim 9, wherein the first polyolefin blend component comprises a virgin LDPE, a LDPE recyclate feedstock, a processed LDPE recyclate, or a combination thereof.

11. The method of claim 1, wherein the LDPE recyclate product is added in an amount in the range of from 5 wt. % to 90 wt. % based on the combined weight of the LDPE recyclate product and the first polyolefin blend component.

12. The method of claim 1, wherein the compounding conditions include a temperature less than or equal to 300° C.

13. The method of claim 1, further comprising:

adding a second polyolefin blend component to a third extruder;

effecting melt conditions in the third extruder to produce a second polyolefin blend component melt; and withdrawing the second polyolefin blend component melt as the first polyolefin blend component.

14. The method of claim 13, wherein the second blend component comprises a virgin LDPE, a LDPE recyclate feedstock, a processed LDPE recyclate, or a combination thereof.

* * * * *